(12) United States Patent
Kitaura et al.

(10) Patent No.: US 8,613,219 B2
(45) Date of Patent: Dec. 24, 2013

(54) CATALYST ABNORMALITY DIAGNOSIS APPARATUS

(75) Inventors: Koichi Kitaura, Odawara (JP); Takahiko Fujiwara, Susono (JP); Yuuji Miyoshi, Susono (JP); Ryota Onoe, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/642,820

(22) PCT Filed: Apr. 23, 2010

(86) PCT No.: PCT/JP2010/002948
§ 371 (c)(1),
(2), (4) Date: Oct. 22, 2012

(87) PCT Pub. No.: WO2011/132232
PCT Pub. Date: Oct. 27, 2011

(65) Prior Publication Data
US 2013/0036808 A1 Feb. 14, 2013

(51) Int. Cl.
*G01M 15/10* (2006.01)
(52) U.S. Cl.
USPC .................................................... 73/114.75
(58) Field of Classification Search
USPC ............... 73/23.31, 23.32, 114.69, 114.71, 73/114.72, 114.75
See application file for complete search history.

(56) References Cited

U.S. PATENT DOCUMENTS

| 7,861,514 | B2 * | 1/2011 | Fujiwara et al. | 60/277 |
| 2010/0307135 | A1 * | 12/2010 | Miyamoto et al. | 60/277 |
| 2012/0023913 | A1 * | 2/2012 | Yoshioka et al. | 60/285 |
| 2012/0060805 | A1 * | 3/2012 | Nakano et al. | 123/703 |
| 2013/0180322 | A1 * | 7/2013 | Kitaura | 73/114.75 |

FOREIGN PATENT DOCUMENTS

| JP | 2002-364428 A | 12/2002 |
| JP | 2006-031901 A | 2/2008 |
| JP | 2009-167987 A | 7/2009 |

* cited by examiner

*Primary Examiner* — Eric S McCall
(74) *Attorney, Agent, or Firm* — Gifford, Krass, Sprinkle, Anderson & Citkowski, P.C.

(57) ABSTRACT

Active air-fuel ratio control is performed to alternately control an air-fuel ratio in an area located upstream of a catalyst between a lean side and a rich side. Switching is carried out between lean control and rich control at the same time when an output from a post-catalyst sensor reaches a threshold. Whether the catalyst is normal or abnormal is determined based on the rate of a change in the output from the post-catalyst sensor between a first point of time when a pre-catalyst air-fuel ratio reaches stoichiometry after the output from the post-catalyst sensor reaches the threshold and a second point of time when the output from the post-catalyst sensor reaches the threshold next time.

4 Claims, 15 Drawing Sheets

CATALYST ABNORMALITY DIAGNOSIS APPARATUS

TECHNICAL FIELD

The present invention relates to abnormality diagnosis for a catalyst, and in particular, to an apparatus for diagnosing abnormality of the catalyst arranged in an exhaust passage in an internal combustion engine.

BACKGROUND ART

For example, automobile internal combustion engines include a catalyst installed in an exhaust system to purify exhaust gas. Some such catalysts have an $O_2$ storage capability. When the air-fuel ratio of exhaust gas flowing into the catalyst is higher than a theoretical air-fuel ratio (stoichiometry), that is, the air-fuel ratio is indicative of a lean state, a catalyst with the $O_2$ storage capability absorbs excess oxygen present in the exhaust gas. When the air-fuel ratio of the exhaust gas is lower than the stoichiometry, that is, the air-fuel ratio is indicative of a rich state, the catalyst releases the absorbed oxygen. For example, a gasoline engine controls the air-fuel ratio so as to set the air-fuel ratio of the exhaust gas flowing into the catalyst close to the stoichiometry. When the gasoline engine uses a three-way catalyst with the $O_2$ storage capability, even if the actual air-fuel ratio deviates slightly from the stoichiometry, the three-way catalyst can absorb such a deviation of the air-fuel ratio by the oxygen absorbing and releasing effect.

On the other hand, a degraded catalyst has a reduced conversion efficiency. The degree of degradation of the catalyst correlates with the degree of a decrease in the $O_2$ storage capability. Thus, detection of a reduced $O_2$ storage capability enables degradation or abnormality of the catalyst to be detected. In general, the following method is adopted far the detection: active air-fuel ratio control is performed to alternately control the air-fuel ratio in an area located upstream of the catalyst between a rich side and a lean side, the amount of oxygen absorbed and released by the catalyst is measured during the lean control and the rich control, and the abnormality of the catalyst is diagnosed based on the amount of oxygen (see, for example, Patent Literature 1).

According to this Cmax method, a post-catalyst sensor is provided which detects the exhaust air-fuel ratio in an area located downstream of the catalyst. When an output from the past-catalyst sensor is inverted, then simultaneously the lean control and the rich control are switched from one to another or vice versa, and measurement of the amount of oxygen is ended.

However, when the amount of oxygen is measured, the amount of oxygen that is actually not absorbed or released is also measured, disadvantageously resulting in measurement errors. In particular, according to the conventional Cmax method, an error rate measured immediately before the inversion of the output from the post-catalyst sensor is higher when the catalyst is abnormal than when the catalyst is normal. This enhances the tendency to make the measured value larger than the real value. Then, a catalyst that is actually abnormal may be erroneously diagnosed to be normal. The Cmax method may also preclude an increase in a difference in the measured value of the amount of oxygen between the normal state and abnormal state of the catalyst. In particular, if this difference is originally small, the catalyst may not sufficiently accurately be diagnosed.

Thus, the present invention has been developed in view of the above-described circumstances. An object of the present invention is to provide a catalyst abnormality diagnosis apparatus that can improve the diagnosis accuracy to suppress erroneous diagnoses.

CITATION LIST

Patent Literature

PTL 1: Japanese Patent Laid-Open No. 2002-364428

SUMMARY OF INVENTION

An aspect of the present invention provides a catalyst abnormality diagnosis apparatus that diagnoses abnormality of a catalyst arranged in an exhaust passage in an internal combustion engine, the apparatus being characterized by including:
  acquisition means for acquiring a pre-catalyst air-fuel ratio that is an exhaust air-fuel ratio in an area located upstream of the catalyst;
  a post-catalyst sensor that detects the exhaust air-fuel ratio in an area located downstream of the catalyst;
  active air-fuel ratio control means for alternately controlling the air-fuel ratio in the area located upstream of the catalyst between a lean side and a rich side with respect to a stoichiometry; and
  determination means for determining whether the catalyst is normal or abnormal, and
  in that the active air-fuel ratio control means switches between the lean control and the rich control at an identical time when an output from the post-catalyst sensor reaches a threshold, and
  the determination means determines whether the catalyst is normal or abnormal based on a rate of a change in the output from the post-catalyst sensor between a first point of time when the pre-catalyst air-fuel ratio acquired by the acquisition means reaches the stoichiometry after the output from the post-catalyst sensor reaches the threshold and a second point of time when the output from the post-catalyst sensor reaches the threshold next time.

Preferably, the threshold comprises a lean threshold that defines a timing for switching from the lean control to the rich control and a rich threshold that defines a timing for switching from the rich control to the lean control,
  the lean threshold is set to a value richer than a reference lean determination value defined to be leaner than a stoichiometry equivalent value of the output from the post-catalyst sensor, and
  the rich threshold is set to a value leaner than a reference rich determination value defined to be richer than the stoichiometry equivalent value.

Preferably, the lean threshold and the rich threshold are set to an equal value.

Preferably, each of the lean threshold and the rich threshold is set equal to the stoichiometry equivalent value.

Preferably, the lean threshold is set to a value richer than the stoichiometry equivalent value, and the rich threshold is set to a value leaner than the stoichiometry equivalent value.

Preferably, the lean threshold and the rich threshold are set according to a flow rate of exhaust gas.

Preferably, the change rate has a value obtained by dividing the difference between the output from the post-catalyst sensor at the first point of time and the output from the post-catalyst sensor at the second point of time by a time between the first point of time and the second point of time.

Preferably, the change rate has a value obtained by dividing the difference between the output from the post-catalyst sensor at the first point of time and the output from the post-catalyst sensor at the second point of time by an amount of exhaust gas measured between the first point of time and the second point of time.

DESCRIPTION OF EMBODIMENTS

Preferred embodiments of the present invention will be described below with reference to the accompanying drawings.

Figure 1:
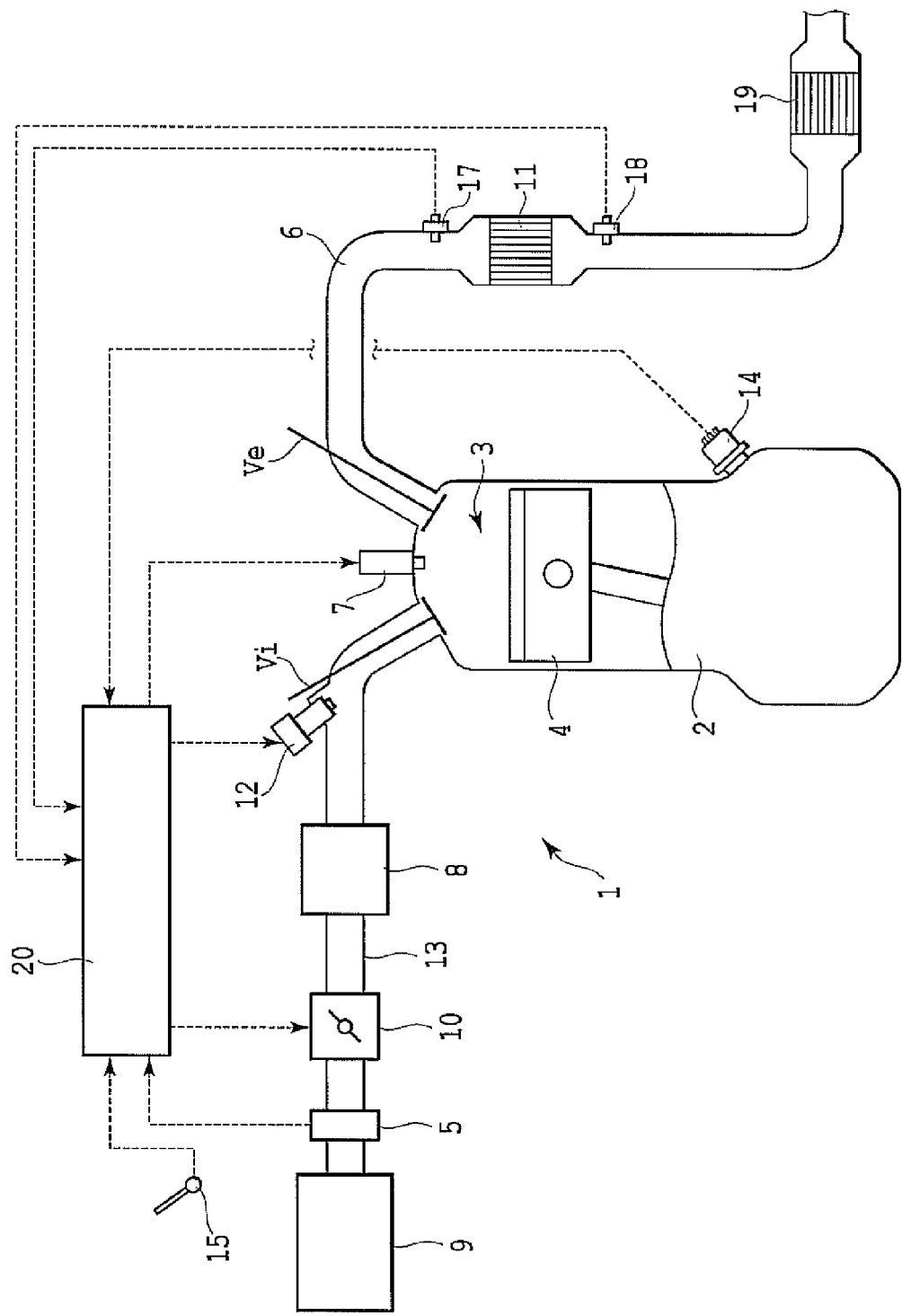
FIG. 1 is a schematic diagram showing a configuration of an embodiment of the present invention.

FIG. 1 is a schematic diagram showing a configuration according to the present embodiment. As shown in FIG. 1, an engine 1 that is an internal combustion engine combusts a mixture of fuel and air inside a combustion chamber 3 formed in a cylinder block 2 and reciprocates a piston 4 inside the combustion chamber 3 to generate power. The engine 1 according to the present embodiment is a multi-cylinder engine (only one cylinder is shown) and is a spark ignition internal combustion engine and more specifically a gasoline engine.

A cylinder head in the engine 1 includes intake valves Vi and exhaust valves Ve arranged therein so that each intake valve Vi and each exhaust value Ve correspond to one of the cylinders; the intake valve Vi opens and closes an intake port, and the exhaust valve Ve opens and closes an exhaust port. Each intake valve Vi and each exhaust valve Ve are opened and closed by a cam shaft (not shown in the drawings). Furthermore, spark plugs 7 are attached to the top of the cylinder head for the respective cylinders to ignite the air-fuel mixture in the combustion chamber 3.

The exhaust port of each cylinder is connected via an exhaust manifold to a surge tank 8 that is an exhaust assembly chamber. An intake pipe 13 forming an intake assembly passage is connected to an upstream side of the surge tank 8. An air cleaner 9 is provided at an upstream end of the intake pipe 13. The intake pipe 13 includes an air flow meter 5 and an electronically controlled throttle valve 10 provided in this order from the upstream side of the engine; the air flow meter 5 detects the amount of air flowing into the engine per unit time, that is, an intake air amount Ga (g/s). The intake port, the intake manifold, the surge tank 8, and the intake pipe 13 form an intake passage.

An intake passage, particularly an injector that injects fuel into the intake port, that is, a fuel injection valve 12, is disposed on each cylinder. Fuel injected by the injector 12 is mixed with intake air into an air-fuel mixture, which is sucked into the combustion chamber 3 when the intake valve Vi is opened. The air-fuel mixture is then compressed by the piston 4, and the compressed mixture is ignited and combusted by the spark plug 7.

On the other hand, the exhaust port in each cylinder is connected via an exhaust manifold to an exhaust pipe 6 forming an exhaust assembly passage. The exhaust port, the exhaust manifold, and the exhaust pipe 6 form an exhaust passage. The exhaust pipe 6 includes catalysts arranged on an upstream side and a downstream side thereof, respectively, and in series and each including a three-way catalyst with an $O_2$ storage capability, that is, an upstream catalyst 11 and a downstream catalyst 19. For example, the upstream catalyst 11 is located immediately after the exhaust manifold. The downstream catalyst 19 is located, for example, under the floor of the vehicle.

Figure 5:
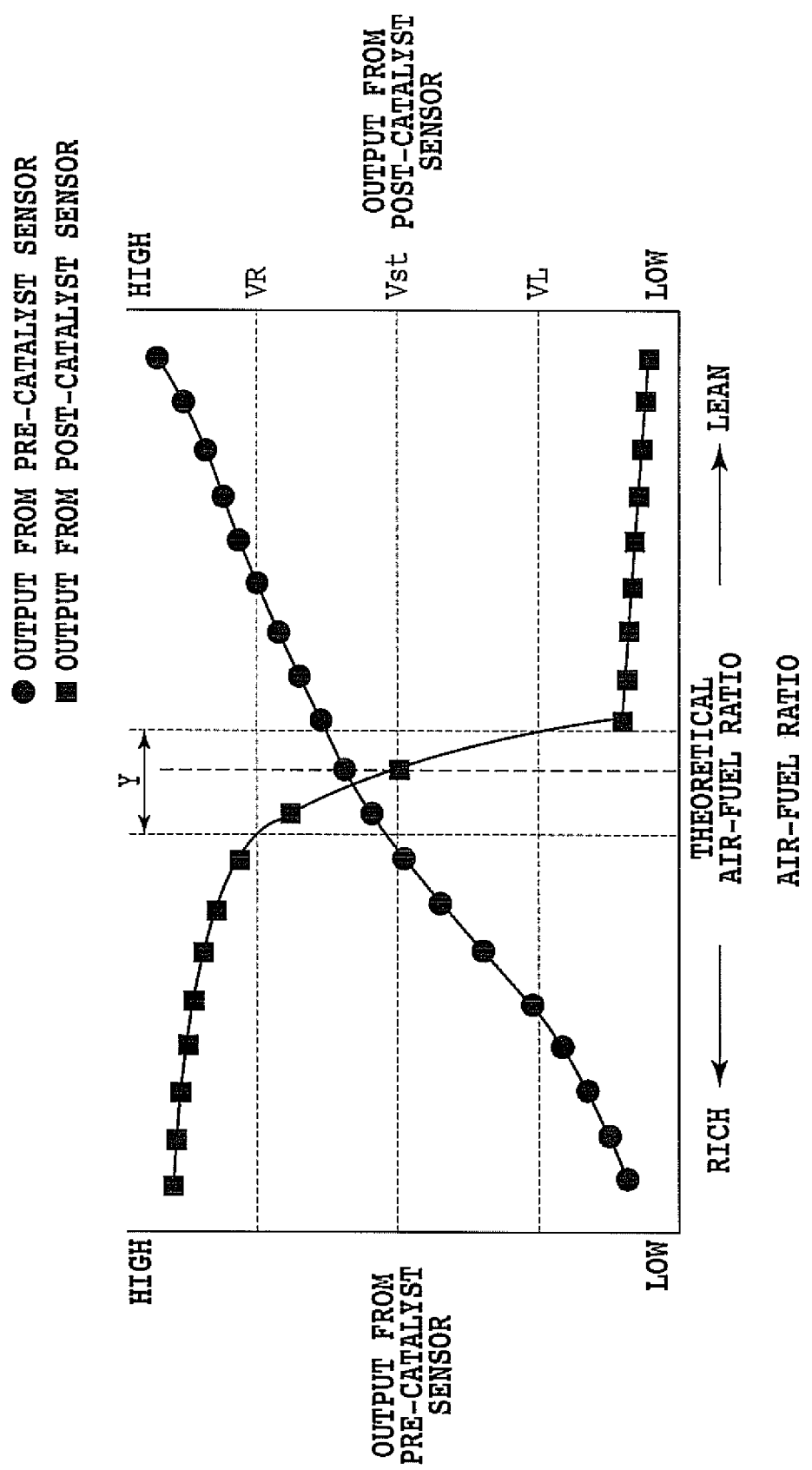
FIG. 5 is a graph showing output characteristics of a pre-catalyst sensor and a post-catalyst sensor.

Air-fuel ratio sensors that detect the air-fuel ratio of exhaust gas (exhaust air-fuel ratio), that is, a pre-catalyst sensor 17 and a post-catalyst sensor 18, are provided upstream and downstream, respectively, of the upstream catalyst 11. As shown in FIG. 5, the pre-catalyst sensor 17 is formed of what is called a wide-area air-fuel ratio sensor and can continuously detect the air-fuel ratio over a relatively wide range. The pre-catalyst sensor 17 outputs a signal proportional to the air-fuel ratio. On the other hand, the post-catalyst sensor 18 is formed of what is called an oxygen sensor ($O_2$ sensor), and has the property of rapidly changing an output value before and after a theoretical air-fuel ratio is reached (Z property).

The spark plug 7, the throttle valve 10, the injector 12, and the like are electrically connected to an electronic control unit (hereinafter referred to as an ECU) 20 serving as control means. The ECU 20 includes a CPU, a ROM, a RAM, an I/O port, and a storage device none of which is shown in the drawings. Furthermore, as shown in FIG. 5, the ECU 20 connects to, besides the air flow meter 5, the pre-catalyst sensor 17, and the post-catalyst sensor 18, a crank angle sensor 14 that detects the crank angle of the engine 1, an accelerator opening sensor 15 that detects the opening of an accelerator, and various other sensors, via A/D converters or the like. Based on detected values from the various sensors, the ECU 20 controls the spark plug 7, the injector 12, the throttle valve 10, and the like and thus an ignition period, a fuel injection amount, a fuel injection period, a throttle opening, and the like.

The upstream catalyst 11 and the downstream catalyst 19 simultaneously and very efficiently purify NOx, HC, and CO when the air-fuel ratio A/F of exhaust gas flowing into the these catalysts 11 and 19 has a theoretical value (stoichiometry, for example, A/Fs=14.6). Thus, during normal operation of the engine, the air-fuel ratio of an air-fuel mixture supplied to the combustion chamber 3 (specifically, the amount of fuel injected by the injector 12) is feedback-controlled based on an output from the pre-catalyst sensor 17 so as to make the air-fuel ratio of exhaust gas flowing into the these catalysts 11 and 19 equal to the stoichiometry.

Figure 2:
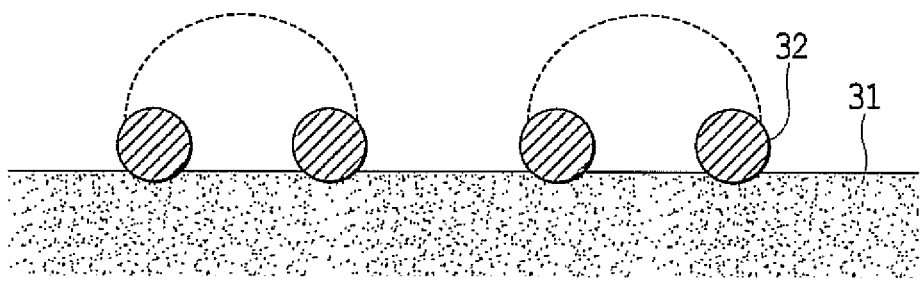
FIG. 2 is a schematic cross-sectional view showing a configuration of a catalyst.

Now, the upstream catalyst 11 to be subjected to abnormality diagnosis will be described in detail. The downstream catalyst 19 is configured similarly to the upstream catalyst 11. As shown in FIG. 2, the catalyst 11 includes a carrier substrate (not shown in the drawings) the surface of which is coated with a coat material 31 including a large number of particulate catalytic components 32 arranged in a distributive manner and carried thereon and exposed inside the catalyst 11. The catalytic components 32 are mostly formed of rare metal such as Pt or Pd and serve as active spots for causing reaction of exhaust gas components such as NOx, HC, and CO. On the other hand, the coat material 31 serves as an assistant catalyst that promotes reaction at the interface between the exhaust gas and the catalytic components 32, and contains storage components that can absorb and release oxygen depending on the air-fuel ratio of atmosphere gas. The $O_2$ storage components are formed of, for example, cerium dioxide $CeO_2$ or zirconium. The term "absorption" or "adsorption" is sometimes used synonymously with the term "storage".

For example, when the atmosphere gas in the catalyst is leaner than the theoretical air-fuel ratio, the $O_2$ storage components present around the catalytic components 32 absorb oxygen from the atmosphere gas, causing NOx to be reduced to allow purification. On the other hand, when atmosphere gas in the catalyst is richer than the theoretical air-fuel ratio, the oxygen stored in the $O_2$ storage components is released. The released oxygen oxidizes HC and CO to allow purification.

Even if the actual air-fuel ratio deviates slightly from the stoichiometry during normal stoichiometry air-fuel ratio control, the above-described oxygen absorbing and releasing effect allows the deviation to be absorbed.

In a new catalyst 11, a large number of the catalytic components 32 are evenly arranged in a distributive manner as described above. This keeps exhaust gas likely to come into contact with the catalytic components 32. However, when the catalyst 11 starts to be degraded, some of the catalytic components 32 may be lost or baked by exhaust heat and sintered (see a dashed line in FIG. 2). This reduces the likelihood of bringing the exhaust gas into contact with the catalytic components 32, thus decreasing a conversion efficiency. In addition, the amount of the coat material 31 present around the catalytic components 32, that is, the amount of $O_2$ storage components, decreases, thus reducing the $O_2$ storage capability itself.

As described above, the degree of degradation of the catalyst 11 correlates with the degree of a decrease in $O_2$ storage capability.

[Basic Method for Abnormality Diagnosis]

The $O_2$ storage capability of the catalyst 11 can be expressed by the magnitude of an $O_2$ storage capacity (OSC; expressed in units of gram) that is the amount of oxygen that can be absorbed or released by the current catalyst 11. That is, the $O_2$ storage capacity increases with decreasing degree of degradation of the catalyst and increasing $O_2$ storage capability. The $O_2$ storage capacity decreases with increasing degree of degradation of the catalyst and decreasing $O_2$ storage capability.

Hence, a method of measuring the $O_2$ storage capacity and diagnosing abnormality of the catalyst based on the measured value, that is, a Cmax method, is commonly used. This method is hereinafter referred to as a basic method.

The basic method will be described below. For abnormality diagnosis, first, the ECU 20 performs active air-fuel ratio control. That is, the ECU 20 alternately controls the air-fuel ratio in an area located upstream of the catalyst, specifically the air-fuel ratio of the air-fuel mixture in the combustion chamber 3, between the rich side and the lean side with respect to the stoichiometry A/Fs, the central air-fuel ratio. This also allows the air-fuel ratio of exhaust gas supplied to the catalyst 11 to be alternately controlled between the rich side and the lean side.

Furthermore, the active air-fuel ratio control and the diagnosis are carried out only when predetermined prerequisites are met. The prerequisites will be described below.

A method for measuring the $O_2$ storage capacity of the upstream catalyst 11 will be described below with reference to FIG. 3 and FIG. 4.

In FIG. 3(A), a dashed line indicates a target air-fuel ratio A/Ft, a solid line indicates the output from the pre-catalyst sensor 17 (a value equivalent to a pre-catalyst air-fuel ratio A/Ffr). Furthermore, in FIG. 3(B), a solid line indicates the output from the post-catalyst sensor 18 (the output voltage Vr of the post-catalyst sensor 18).

As shown in FIGS. 3(A) and 3(B), before a point of time t1, lean control is performed so as to switch the air-fuel ratio to a lean value. At this time, the target air-fuel ratio A/Ft is set equal to a lean air-fuel ratio A/F1 (for example, 15.1). Leaner gas with an air-fuel ratio equal to the target air-fuel ratio is supplied to the catalyst 11. At this time, the catalyst 11 continuously absorbs oxygen. However, when the catalyst 11 is saturated, that is, becomes full of oxygen, the catalyst 11 can no longer absorb oxygen. As a result, lean gas passes through the catalyst 11 and starts to flow to an area located downstream of the catalyst 11. Then, the output from the post-catalyst sensor 18 changes to a lean side. At the point of time t1, the output voltage Vr reaches a lean determination value VL (for example, 0.2 V), and then the target air-fuel ratio A/Ft is switched to a rich air-fuel ratio A/Fr (for example, 14.1). Thus, the air-fuel ratio control is switched from the lean control to the rich control, and rich gas with an air-fuel ratio equal to the target air-fuel ratio A/Ft starts to be supplied.

When rich gas is supplied, the catalyst 11 continues to release the stored oxygen. Then, all of the stored oxygen is released by the catalyst 11. At this point of time, the catalyst 11 can no longer release oxygen, and rich gas passes through the catalyst 11 and starts to flow to an area located downstream of the catalyst 11. Then, the output from the post-catalyst sensor 18 changes to the rich side. At a point of time t2, the output voltage Vr reaches a rich determination value VR (for example, 0.6 V), and then the target air-fuel ratio A/Ft is switched to the rich air-fuel ratio A/F1. Thus, the air-fuel ratio control is switched from the rich control to the lean control, and lean rich gas with an air-fuel ratio equal to the target air-fuel ratio A/Ft starts to be supplied.

The catalyst 11 absorbs oxygen again until the catalyst 11 becomes full of oxygen. Then, the output voltage Vr of the post-catalyst sensor 18 reaches the lean determination value VL. At this point of time t3, the target air-fuel ratio A/Ft is switched to the rich air-fuel ratio A/Fr, and the rich control is started.

Thus, every time the output from the post-catalyst sensor 18 is inverted, the lean control operation and the rich control operation are alternately and repeatedly performed. A set of contiguous lean and rich control operations corresponds to one cycle of active air-fuel ratio control. Predetermined N cycles (N is an integer of at least 2) of active air-fuel ratio control are carried out.

Here, the lean determination value VL serves as a reference for a threshold that defines a timing for switching from the lean control to the rich control. As also shown in FIG. 5, the lean determination value VL is defined to be a (lean-side) value smaller than a stoichiometry equivalent value Vst for the output from the post-catalyst sensor.

Similarly, the rich determination value VR serves as a reference for a threshold that defines a timing for switching from the rich control to the lean control. As also shown in FIG. 5, the rich determination value VR is defined to be a (rich-side) value larger than the stoichiometry equivalent value Vst for the output from the post-catalyst sensor.

While the active air-fuel ratio control is being performed, the $O_2$ storage capacity OSC of the catalyst 11 is measured as follows.

The time for which oxygen can be continuously absorbed or released increases consistently with the $O_2$ storage capacity of the catalyst 11. That is, the inversion period (for example, the time between t1 and t2) of the output Vr from the post-catalyst sensor is long if the catalyst is not degraded and decreases with progression of degradation of the catalyst.

Thus, this is utilized to measure the $O_2$ storage capacity OSC as follows. As shown in FIG. 4, at the point of time t1, the target air-fuel ratio A/Ft is switched to the rich air-fuel ratio A/Fr, and slightly after this, a pre-catalyst air-fuel ratio A/Ff serving as an actual value is switched to the rich air-fuel ratio A/Fr. Then, between a point of time t11 when the pre-catalyst air-fuel ratio A/Ff reaches the stoichiometry A/Fs and the point of time t2 when the output Vr from the post-catalyst sensor is inverted, an $O_2$ storage capacity dOSC is sequentially calculated at predetermined calculation intervals. Furthermore, the $O_2$ storage capacity dOSC is sequentially integrated between the point of time t1 and the point of time t2. Thus, the $O_2$ storage capacity OSC as the final integrated value for the rich control, that is, the amount of released oxygen shown in FIG. 4 as OSCb, is measured.

[Expression 1]

$$dOSC = \Delta A/F \times Q \times \sigma = |A/Ff - A/Fs| \times Q \times \sigma \quad (1)$$

"Q" denotes the amount of injected fuel, and the amount of air corresponding to insufficiency or excess with respect to the stoichiometry can be calculated by multiplying a difference in air-fuel ratio ΔA/F by the amount of injected fuel Q. "σ" denotes a constant indicative of the rate of oxygen contained in the air (the rate is about 0.23).

Figure 9:
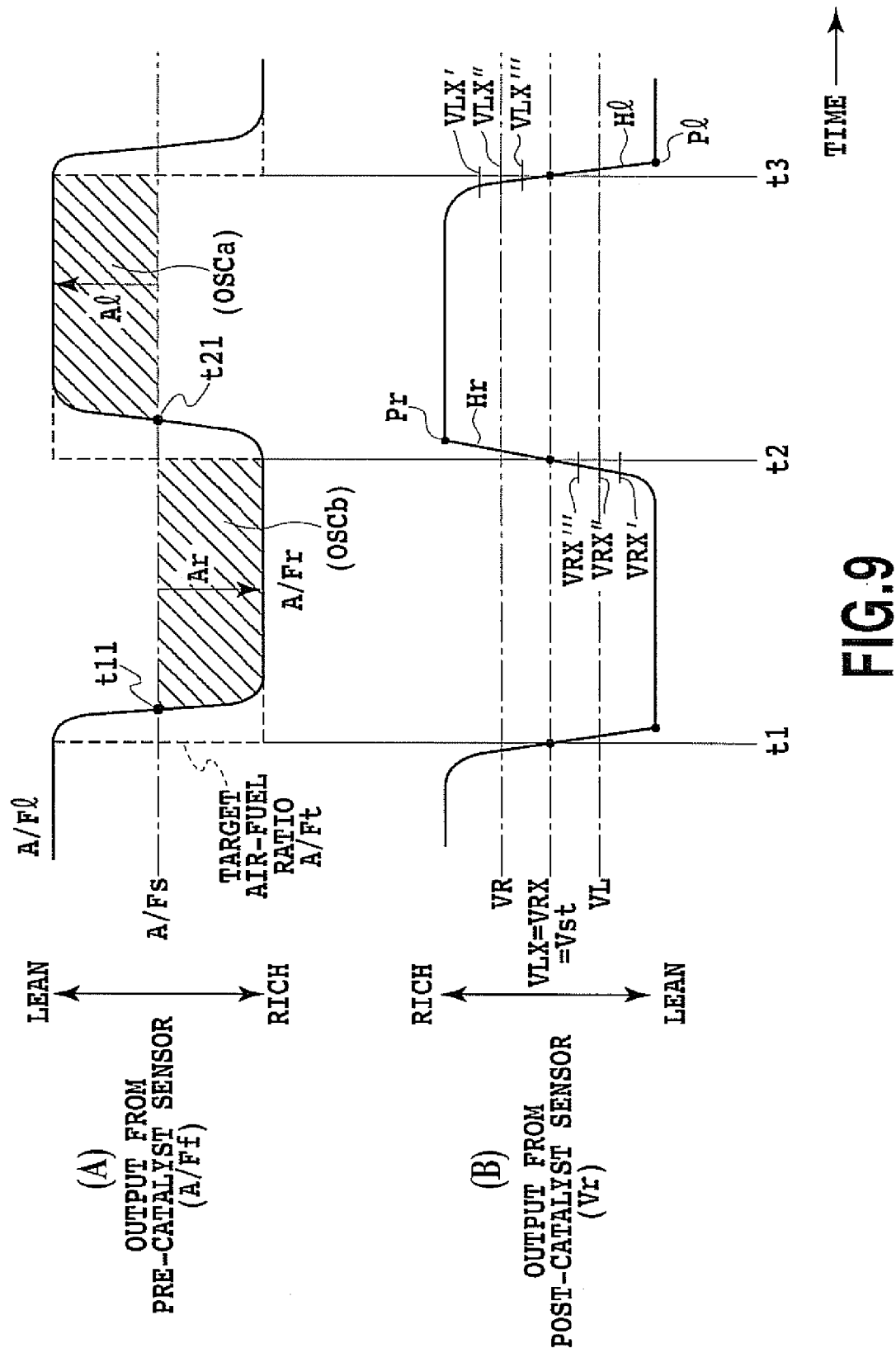
FIG. 9 is a time chart obtained by modifying FIG. 3 and FIG. 4 in conformity with the present embodiment.

Also for the lean control, the $O_2$ storage capacity, that is, the $O_2$ storage capacity shown in FIG. 9 as OCSa, is measured in accordance with Expression (1). Every time the rich control operation and the lean control operation are alternately performed, the amount of released oxygen and the amount of absorbed oxygen are alternately measured.

Then, when a plurality of measured values of the amount of released oxygen and a plurality of measured values of the amount of absorbed oxygen are obtained, whether the catalyst is normal or abnormal is determined as follows.

First, the ECU 20 calculates the average value OSCav of the measured values of the amount of released oxygen and the amount of absorbed oxygen. The ECU 20 then compares the average value OSCav with a predetermined abnormality determination value α. When the average value OSCav is larger than the abnormality determination value α, the ECU 20 determines the catalyst 11 to be normal. When the average value OSCav is equal to or smaller than the abnormality determination value α, the ECU 20 determines the catalyst 11 to be abnormal. If the catalyst is determined to be abnormal, a warning device such as a check lamp (not shown in the drawings) is preferably activated to inform the user of this fact.

[Abnormality Diagnosis Method According to the Present Embodiment]

Now, the abnormality diagnosis method according to the present embodiment will be described. The "$O_2$ storage capacity OSC" and the "amount of oxygen" collectively refer to the "amount of absorbed oxygen OSCa" and the "amount of released oxygen OSCb".

As described above, the measurement of the $O_2$ storage capacity OSC involves a measurement error problem; the amount of oxygen that is actually not absorbed or released is also measured. In particular, if the basic method such as the Cmax method is used, when the catalyst is abnormal, the error rate measured immediately before the inversion of the output from the post-catalyst sensor is higher than when the catalyst is normal. This enhances the tendency to make the measured value larger than the real value. Then, a catalyst that is actually abnormal may be erroneously diagnosed to be normal.

Figure 6:
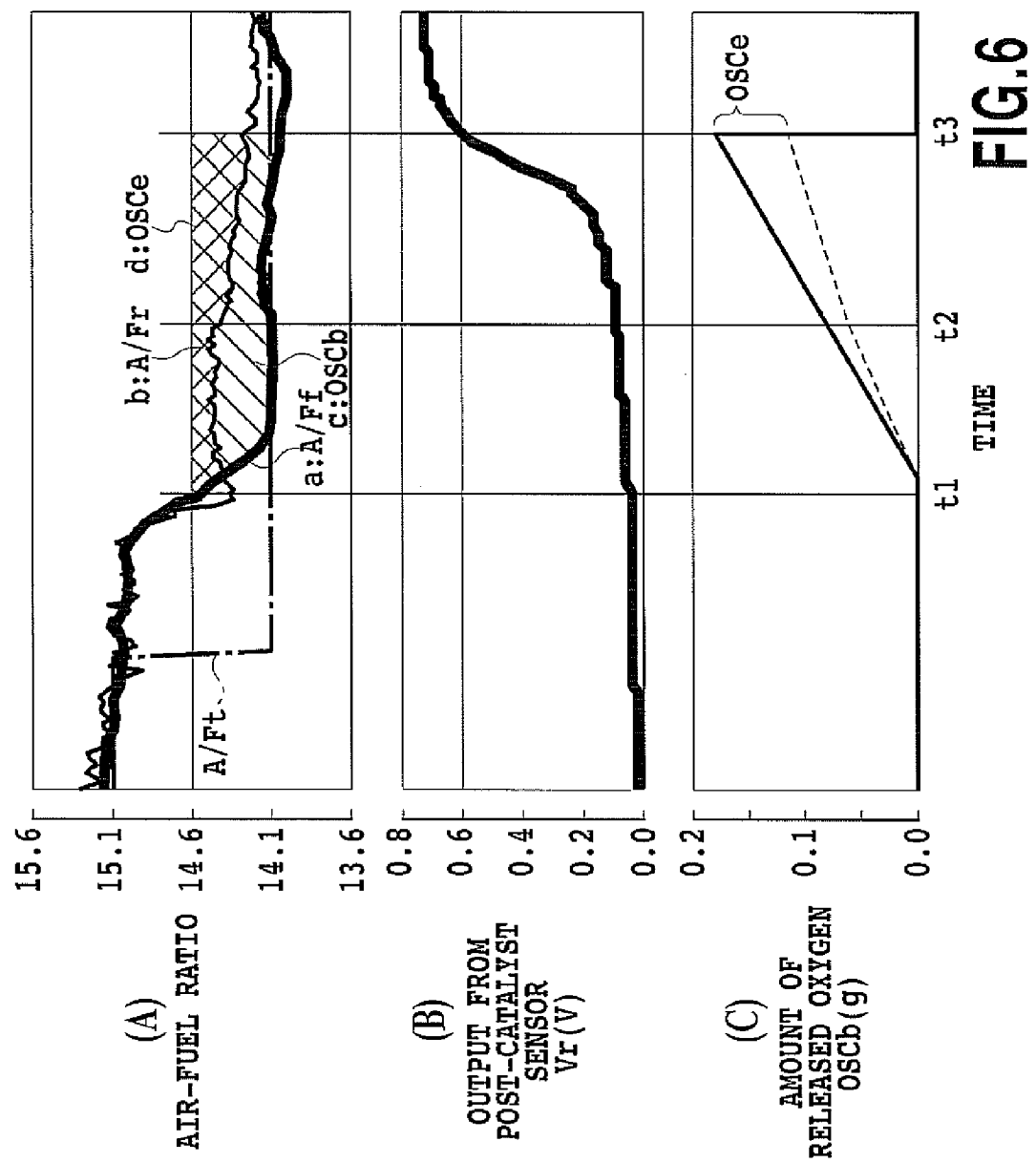
FIG. 6 is a time chart showing results of tests for rich control obtained when the catalyst is normal.
Figure 7:
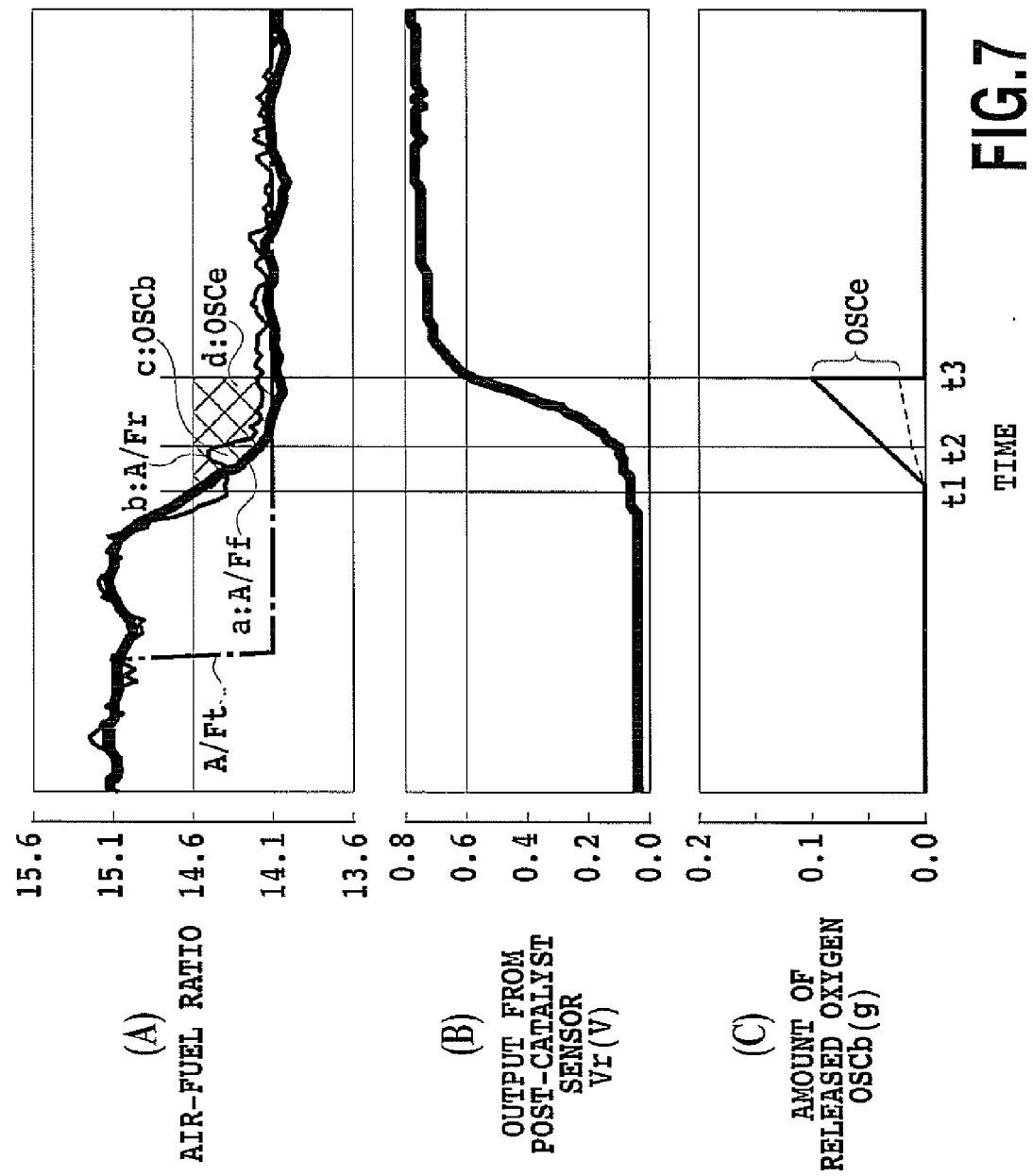
FIG. 7 is a time chart showing results of tests for rich control obtained when the catalyst is abnormal.

This will be described in detail with reference to FIG. 6 and FIG. 7. FIG. 6 shows a case where the catalyst is normal. FIG. 7 shows a case where the catalyst is abnormal. Both figures show the results of tests where the lean control is switched to the rich control. In this case, even when the output Vr from the post-catalyst sensor is inverted (that is, even when the output reaches the rich determination value VR=0.6 (V)), switching to the lean control is not carried out.

Both FIG. 6(A) and FIG. 7(A) show the pre-catalyst air-fuel ratio A/Ff (line (a)) detected by the pre-catalyst sensor 17, and the post-catalyst air-fuel ratio A/Fr (line (b)). Here, an air-fuel ratio sensor similar to the pre-catalyst sensor 17 is installed downstream of the catalyst for testing. The post-catalyst air-fuel ratio A/Fr is detected by this air-fuel ratio sensor.

FIG. 6(B) and FIG. 7(B) show the output Vr from the post-catalyst sensor, and FIG. 6(C) and FIG. 7(C) show the integrated value of the amount of released oxygen OSCb. The output Vr from the post-catalyst sensor may vary within the range between 0 (V) and 1 (V).

First, the case where the catalyst is normal as shown in FIG. 6 will be described. After switching to the rich control, the pre-catalyst air-fuel ratio A/Ff decreases, and reaches the stoichiometry (=14.6) at the point of time t1. Then, the output Vr from the post-catalyst sensor increases toward the rich side, and reaches the rich determination value VP at the point of time t3. The amount of released oxygen OSCb is integrated between the point of time t1 and the point of time t3. The final integrated value of the amount of released oxygen OSCb at the point of time t3 can be expressed by the size of an area (c) shown in FIG. 6(A). The area (c) is enclosed by the stoichiometry (14.6) and the pre-catalyst air-fuel ratio A/Ff between the point of time t1 and the point of time t3.

On the other hand, within the period between t1 and t3, the post-catalyst air-fuel ratio is slightly richer than the stoichiometry. The size of an area (d) enclosed by the stoichiometry and the post-catalyst air-fuel ratio A/Fr indicates a portion of the rich gas which can actually not be treated by the catalyst, in other words, the amount of oxygen that cannot be released by the catalyst (this amount is referred to as OSCe for convenience). The size of the area (d) corresponds to an error in the total amount of released oxygen OSCb at the point of time t3.

A value obtained by subtracting the size of the area (d) (OSCe) from the size of the area (c) (OSCb) corresponds to the amount of oxygen actually released by the catalyst. Thus, the measured amount of released oxygen OSCb includes the amount of oxygen that is actually not released.

The apparatus configuration according to the present embodiment includes no air-fuel ratio sensor capable of detecting even the absolute value of the post-catalyst air-fuel ratio A/Fr. The apparatus configuration thus fails to independently measure errors themselves. For convenience, the apparatus configuration determines the size of the area (c)

enclosed by the stoichiometry and the pre-catalyst air-fuel ratio to be the amount of released oxygen OSCb.

Now, the post-catalyst air-fuel ratio A/Fr and the output Vr from the post-catalyst sensor will be discussed. At the point of time t2 between the point of time t1 and the point of time t3, the post-catalyst air-fuel ratio A/Fr starts to decrease toward the rich side, and the speed at which the output Vr from the post-catalyst sensor increases toward the rich side or the change rate of the output Vr starts to increase. This may mean that the catalyst substantially ends releasing oxygen at the point of time t2 and then relatively slowly releases oxygen remaining therein or that the main oxygen release, which ends at the point of time t2, is followed by secondary release of the remaining oxygen.

Even during the period between the point of time t2 and the point of time t3, there is a difference between the post-catalyst air-fuel ratio A/Fr and the pre-catalyst air-fuel ratio A/Ff. Oxygen is actually released, with rich gas treated. Thus, errors are expected to account for a relatively small percentage of the amount of released oxygen OSCb measured during the period between t2 and t3. When the catalyst is normal, the total amount of released oxygen measured during the whole period between t1 and t3 has a large value. Thus, the errors during the period between t2 and t3 are expected to account for a relatively small percentage of the total amount of released oxygen.

FIG. 6(C) schematically shows the amount of oxygen OSCe corresponding to the errors. The amount of oxygen OSCe corresponding to the errors accounts for a relatively small percentage of the total amount of released oxygen at the point of time t3.

In contrast, if the catalyst is abnormal as shown in FIG. 7, there is almost no difference between the post-catalyst air-fuel ratio A/Fr and the pre-catalyst air-fuel ratio A/Ff during the period between the point of time t2 and the point of time t3. This means that the catalyst releases substantially no oxygen. However, even during the period between t2 and t3, the difference between the stoichiometry and the pre-catalyst air-fuel ratio A/Ff is integrated so that the measured amount of released oxygen indicates that the catalyst is releasing oxygen.

Thus, errors are expected to account for a very large percentage of the amount of released oxygen OSCb measured during the period between t2 and t3. If the catalyst is abnormal, the total amount of released oxygen measured during the whole period between t1 and t3 has only a small value, and thus the errors during the period between t2 and t3 are expected to account for a large percentage of the total amount of released oxygen.

FIG. 7(C) schematically shows the amount of oxygen OSCe corresponding to the errors. The amount of oxygen OSCe corresponding to the errors accounts for a large percentage of the total amount of released oxygen measured at the point of time t3.

As described above, according to the basic method, when the catalyst is abnormal, the error rate measured immediately before the inversion of the output from the post-catalyst sensor is higher than when the catalyst is normal. This increases the rate of increase in measured value with respect to the real value. Then, a catalyst that is actually abnormal may be erroneously diagnosed to be normal.

Furthermore, the basic method fails to increase the difference in the measured value of the amount of oxygen between the normal state and abnormal state of the catalyst. In particular, if this difference is originally small, the catalyst may not sufficiently accurately be diagnosed. There has been a recent tendency to reduce the amount of rare metal in catalysts. Catalysts with the reduced amount of rare metal originally have only a small difference in the amount of oxygen that can be absorbed and released, between the normal state and the abnormal state. Thus, a high error rate prevents determination of a slight difference in the amount of oxygen between the normal state and abnormal state of the catalyst, precluding a sufficient diagnosis accuracy from being ensured.

This problem also results from control delay occurring temporally close to inversion of the output from the post-catalyst sensor. That is, the post-catalyst sensor 18 involves a response delay in which even the actual supply of rich gas fails to allow the output to immediately switch to the rich side. The post-catalyst sensor 18 also involves a transportation delay in which after the air-fuel ratio in the combustion chamber 3 is switched to a rich value, a certain time is required for the rich gas to reach the vicinity of the catalyst. The response delay and the transportation delay are collectively referred to as a control delay. During a control delay, unpurified rich gas is discharged by the catalyst, thus degrading emission.

In the example in FIG. 7, emission degradation caused by a response delay is suppressed if the output Vr from the post-catalyst sensor instantaneously reaches the rich determination value VR at the point of time t2 when a significant amount of rich gas starts to leak from the catalyst. However, this does not actually occur, and thus the response delay significantly degrades the emission. Furthermore, even if the air-fuel ratio is switched to a lean value at the point of time t3, rich gas is supplied to the catalyst during a transportation delay and cannot be treated by the catalyst. Hence, emission degradation also results from a transportation delay.

The above described example relates to the rich control. However, a similar problem is involved in the lean control.

Thus, to solve this problem, the present embodiment changes the diagnosis method from the basic method. In brief, first, the measurement of the amount of oxygen is omitted.

Second, the behavior of the output from the post-catalyst sensor after inversion is noted and utilized. After the catalyst substantially ends absorbing or releasing oxygen, untreated gas in the catalyst (rich gas or lean gas) flows out from the catalyst. At this time, a higher degree of abnormality of the catalyst increases the degree of richness or leanness of unaltered gas and results in a tendency to cause the output from the post-catalyst sensor to change rapidly and significantly. Thus, the degree of abnormality of the catalyst can be estimated by utilizing the behavior of the output from the post-catalyst sensor after inversion.

Preferably, the timing for the inversion of the output from the post-catalyst sensor is set at a timing earlier than that according to the basic method. More preferably, the timing for the inversion of the output from the post-catalyst sensor is set as close to a timing for the substantial end of oxygen absorption or release such as the point of time t2 shown in FIG. 6 and FIG. 7, as possible. Thus, untreated gas (rich gas or lean gas) can be prevented from flowing out from the catalyst after the catalyst substantially ends absorbing and releasing oxygen. This in turn enables suppression of diagnosis errors and emission degradation caused by the untreated gas.

Figure 8:
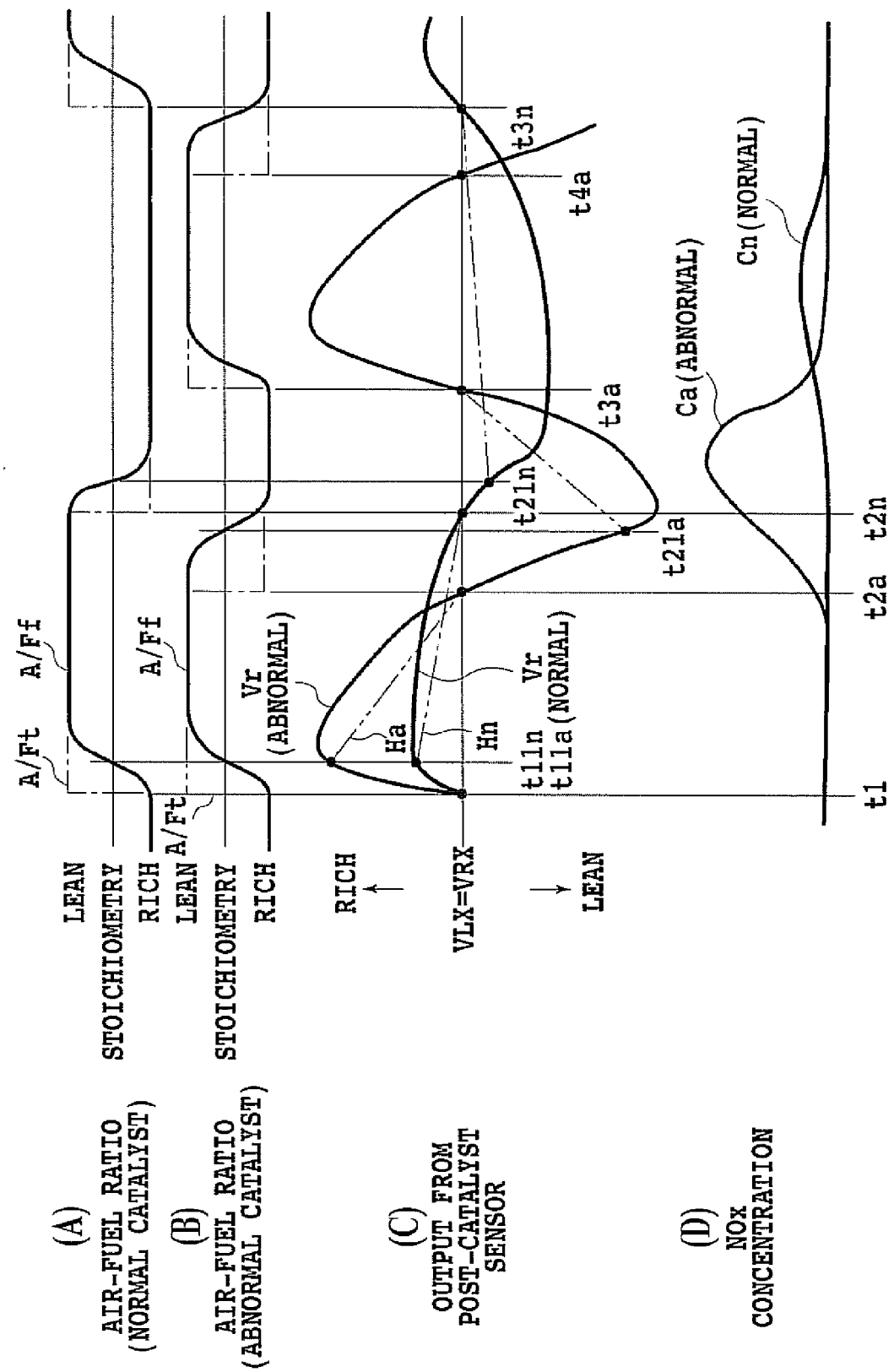
FIG. 8 is a time chart showing changes in relevant values during abnormality diagnosis according to the present embodiment.

FIG. 8 shows changes in relevant values during abnormality diagnosis according to the present embodiment. FIG. 8(A) shows the target air-fuel ratio A/Ft and the pre-catalyst air-fuel ratio A/Ff obtained when the catalyst is normal. FIG. 8(B) shows the target air-fuel ratio A/Ft and the pre-catalyst air-fuel ratio A/Ff obtained when the catalyst is abnormal.

FIG. 8(C) shows the output Vr from the post-catalyst sensor obtained when the catalyst is normal and when the catalyst is abnormal. FIG. 8(D) shows the NOx concentration of exhaust gas discharged by the upstream catalyst 11. For the values in the figures, a suffix "n" indicates that the catalyst is normal, and a suffix "a" indicates that the catalyst is abnormal.

As shown in the figures, at the point of time t1, the air-fuel ratio control is switched from the rich control to the lean control. Thereafter, when the catalyst is normal, the air-fuel ratio control is switched to the rich control at a point of time t2$n$, and the rich control is then switched to the lean control at a point of time t3$n$. When the catalyst is abnormal, the air-fuel ratio control is switched to the rich control at a point of time t2$a$, the rich control is then switched to the lean control at a point of time t3$a$, and the lean control is further switched to the rich control at a point of time t4$a$. Thus, the present embodiment also carries out the active air-fuel ratio control.

A threshold for the output Vr from the post-catalyst sensor which defines the above-described switching timings includes two types of thresholds, a lean threshold VLX that defines a timing from switching from the lean control to the rich control and a rich threshold VRX that defines a timing from switching from the rich control to the lean control.

As shown in FIG. 9, the lean threshold VLX is set to a value richer than the lean determination value VL. The rich threshold VRX is set to a value leaner than the rich determination value VR. In particular, in the example shown in FIG. 8, the lean threshold VLX and the rich threshold VRX are set to an equal value and is specifically set equal to the stoichiometry equivalent value Vst (for example, 0.5 (V)).

Figure 3:
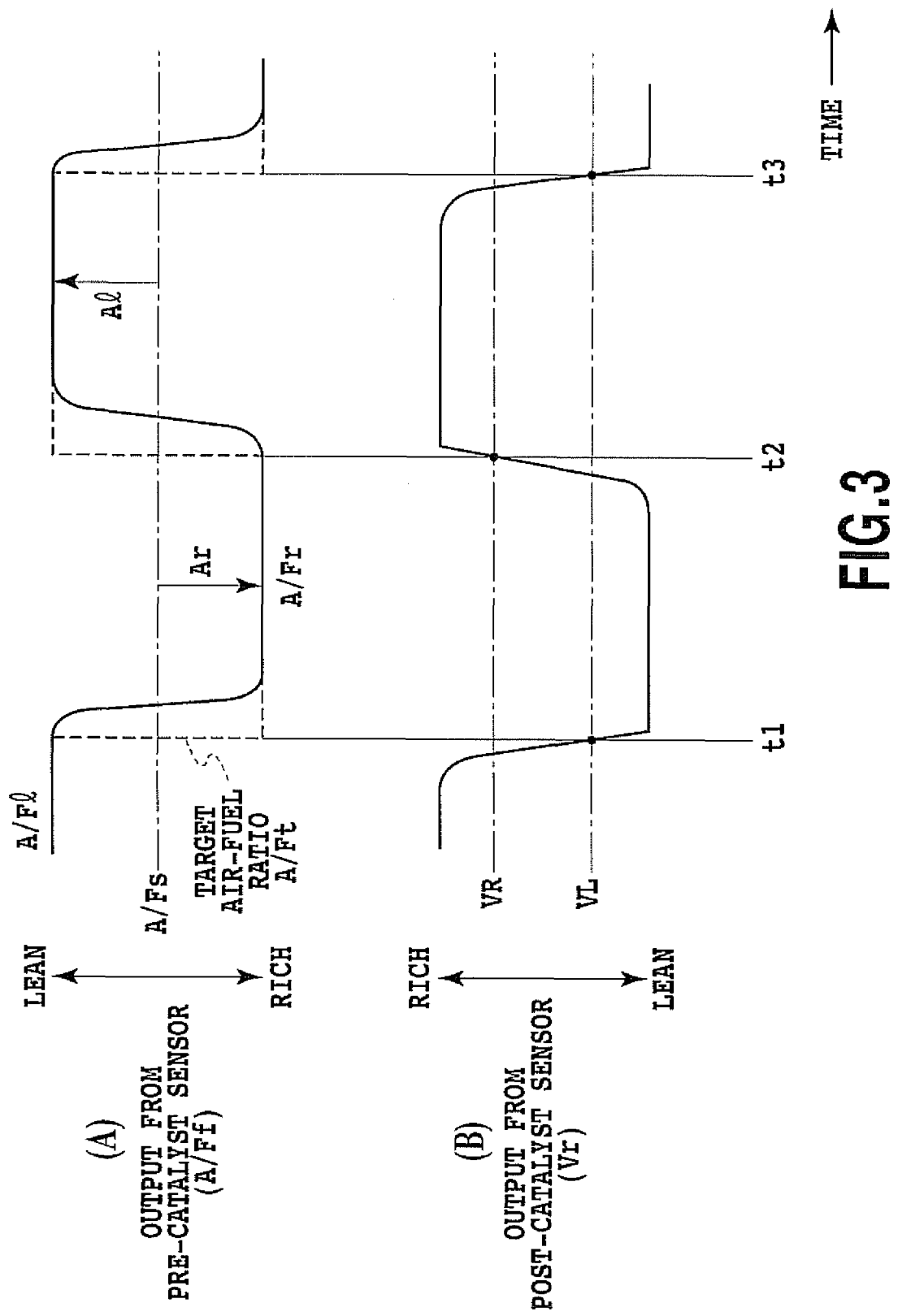
FIG. 3 is a time chart of active air-fuel ratio control in a basic method.
Figure 4:
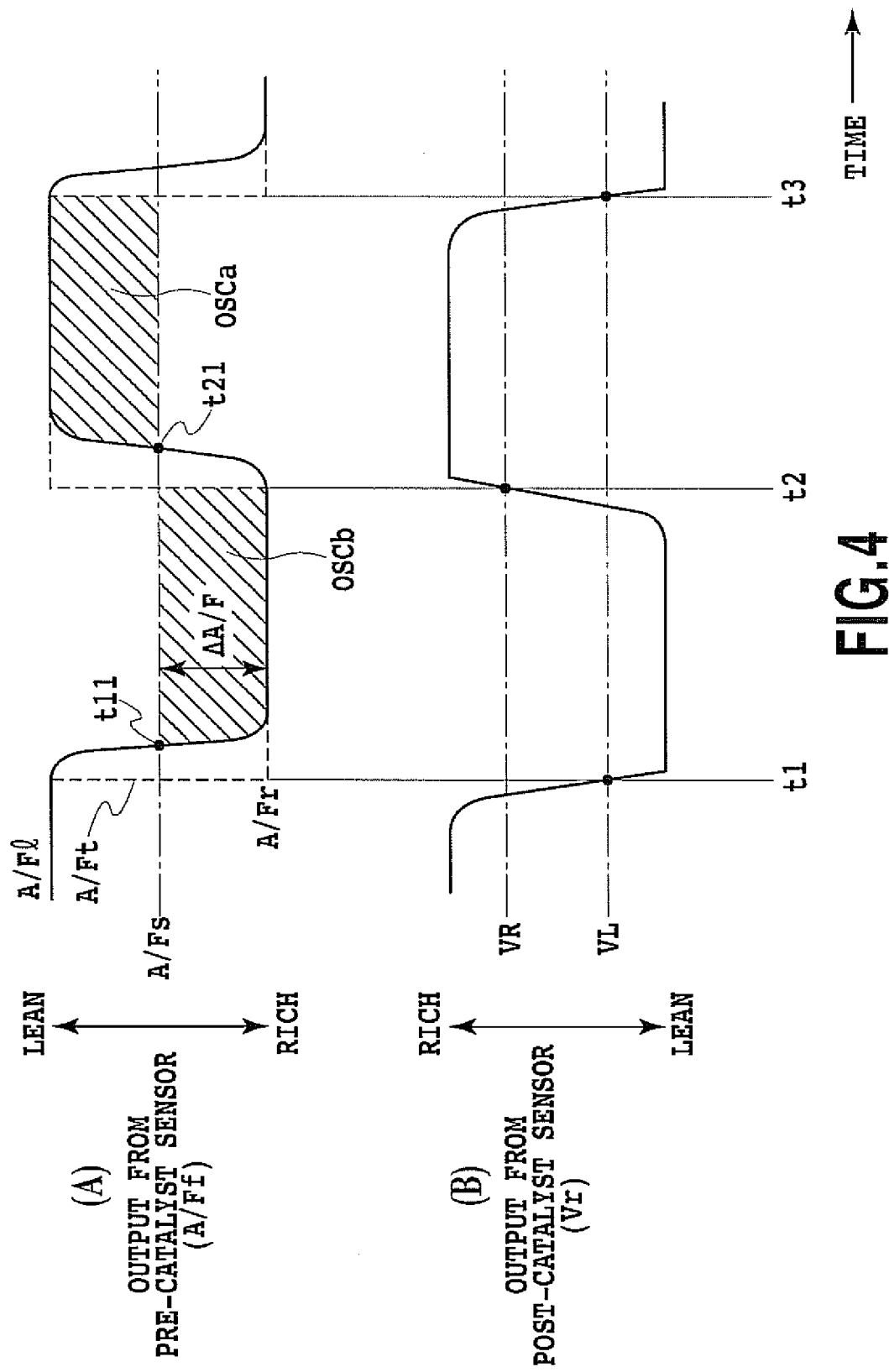
FIG. 4 is a time chart showing a method for measuring an $O_2$ storage capability in the basic method.

Thus, the inversion of the output Vr from the post-catalyst sensor and the switching of the air-fuel ratio control are set to take place at timings earlier than those according to the above-described basic method (FIG. 3 and FIG. 4). This enables minimization of the adverse effects of untreated gas flowing out from the catalyst after the catalyst substantially ends absorbing and releasing oxygen, reducing diagnosis errors.

Furthermore, in FIG. 8, the behavior of the output Vr from the post-catalyst sensor after the output Vr reaches each of the thresholds VLX and VRX is to be noted. For example, after switching to the lean control (t1), when the catalyst is abnormal, the output Vr from the post-catalyst sensor increases more rapidly toward the rich side than when the catalyst is normal, with the maximum peak (rich peak) having a large value.

In contrast, after switching to the rich control (t2$n$ and t2$a$), when the catalyst is abnormal, the output Vr from the post-catalyst sensor decreases more rapidly toward the lean side than when the catalyst is normal, with the minimum peak (lean peak) having a small value.

Thus, when the catalyst tends to be abnormal, the output Vr from the post-catalyst sensor changes rapidly and significantly after switching. Thus, utilizing such a difference in the behavior of the output Vr from the post-catalyst sensor enables the degree of abnormality of the catalyst to be suitably and accurately estimated.

Specifically, whether the catalyst is normal or abnormal is determined based on the rate H of change in the output Vr from the post-catalyst sensor from a first point of time when the pre-catalyst air-fuel ratio A/Ff reaches the stoichiometry after the output Vr reaches the threshold VLX or VRX to a second point of time when the output Vr from the post-catalyst sensor reaches the thresholds VLX or VRX again.

When the catalyst is normal, after the output Vr from the post-catalyst sensor reaches the rich threshold VRX (t1) to switch the air-fuel ratio control to the lean control, the pre-catalyst air-fuel ratio A/Ff reaches the stoichiometry at a point of time t11$n$. The point of time t11$n$ corresponds to the first point of time. Then, the output Vr from the post-catalyst sensor reaches the lean threshold VLX at the point of time t2$n$. The point of time t2$n$ corresponds to the second point of time. The rate Hn of change in the output Vr from the post-catalyst sensor between the point of time t11$n$ and the point of time t2$n$ is calculated by dividing the difference in the output Vr from the post-catalyst sensor between the point of time t11$n$ and the point of time t2$n$ by the time between the point of time t11$n$ and the point of time t2$n$. That is, the change rate Hn is expressed by $Hn=\{(Vr(t2n)-Vr(t11n)\}/(t2n-t11n)$. However, "Vr(t11$n$)" denotes the output from the post-catalyst sensor at the point of time t11$n$. "Vr(t2$n$)" denotes the output from the post-catalyst sensor at the point of time t2$n$. The change rate Hn corresponds to such an inclination as shown in FIG. 8 and means a temporal change rate or a change speed.

Similarly, when the catalyst is abnormal, after the output Vr from the post-catalyst sensor reaches the rich threshold VRX (t1) to switch the air-fuel ratio control to the lean control, the pre-catalyst air-fuel ratio A/Ff reaches the stoichiometry at a point of time t11$a$. The point of time t11$a$ corresponds to the first point of time. Then, the output Vr from the post-catalyst sensor reaches the lean threshold VLX at the point of time t2$a$. The point of time t2$a$ corresponds to the second point of time. The rate Ha of change in the output Vr from the post-catalyst sensor between the point of time t11$a$ and the point of time t2$a$ is expressed by $Ha=\{(Vr(t2a)-Vr(t11a)\}/(t2a-t11a)$.

The change rate Ha in the abnormal state has a larger absolute value (or inclination) that the change rate Fin in the normal state. Thus, the absolute value of the change rate H is indicative of the degree of abnormality of the catalyst. Whether the catalyst is normal or abnormal can be suitably be determined by comparing the absolute value of the change rate H with a predetermined abnormality determination value p. As seen in FIG. 8, during lean control, the change rate H has a negative value.

Now, in the above description, "rich" is changed to "lean". That is, operations performed after the output Vr from the post-catalyst sensor reaches the lean threshold VLX to switch the air-fuel ratio control to the rich control will be described in brief.

When the catalyst is normal, the pre-catalyst air-fuel ratio A/Ff reaches the stoichiometry at a point of time t21$n$. The output Vr from the post-catalyst sensor reaches the rich threshold VRX, the next threshold, at the point of time t3$n$. The rate Hn of change in the output Vr from the post-catalyst sensor during this period is expressed by $Hn=\{(Vr(t3n)-Vr(t21n)\}/(t3n-t21n)$.

When the catalyst is abnormal, the pre-catalyst air-fuel ratio A/Ff reaches the stoichiometry at a point of time t21$a$. The output Vr from the post-catalyst sensor reaches the rich threshold VRX, the next threshold, at the point of time t3$a$. The rate Ha of change in the output Vr from the post-catalyst sensor during this period is expressed by $Ha=\{(Vr(t3a)-Vr(t21a)\}/(t3a-t21a)$. In these cases, the change rate H has a positive value.

The denominator of the above-described change rate is time, and the change rate is defined as the rate of change per unit time. On the other hand, in this case, disadvantageously, the change rate H changes depending on the flow rate of exhaust gas and increases consistently with the flow rate of exhaust gas.

Thus, alternatively, to avoid the adverse effects of the flow rate of exhaust gas, the amount of exhaust gas may be used as the denominator of the change rate, and the change rate H may be defined as the rate of change per the amount of exhaust gas.

Specifically, for example, for the change rate Ha in the abnormal state between the point of time t11a and the point of time t2a, the flow rate of exhaust gas is integrated between the point of time t11a and the point of time t2a to determine the amount M of exhaust gas passing through the catalyst during this period. Then, the {(Vr(t2a)−Vr(t11a)} is divided by the amount of exhaust gas M to obtain the change rate Ha.

The flow rate of exhaust gas may be directly detected by a separately provided exhaust gas flow rate sensor. However, according to the present embodiment, the value of the amount of intake air Ga detected by the air flow meter 5 is used instead.

NOx concentrations Cn and Ca shown in FIG. 8(D) indicate the concentrations of NOx discharged by the catalyst immediately after the end of the lean controls (t1 to t2n or t1 to t2a). The NOx concentrations Cn and Ca correlate with the behavior of the output Vr from the post-catalyst sensor immediately after the end of the lean control. That is, when the catalyst tends to be abnormal and as the output Vr from the post-catalyst sensor changes rapidly and significantly (that is, as the absolute value of the change rate H increases or the lean peak value decreases), the NOx concentration increases rapidly and significantly. Then, the emission tends to be degraded.

Of course, since the inversion of the output Vr from the post-catalyst sensor is set to take place at a timing earlier than that according to the basic method, the degree of emission degradation is lower than according to the basic method.

FIG. 9 is a diagram obtained by modifying FIG. 3 and FIG. 4 in conformity with the present embodiment in order to make differences from the basic method easily understood. The lean threshold VLX and the rich threshold VRX are set equal to the stoichiometry equivalent value Vst.

For example, during the rich control period (according to the preset embodiment, between t1 and t2), the basic method does not carry out the switching unless the output Vr from the post-catalyst sensor increases to the rich determination value VR, which is larger than the stoichiometry equivalent value Vst. In contrast, the present embodiment carries out the switching provided that the output Vr from the post-catalyst sensor increases to the rich threshold VRX, which is leaner than the rich determination value VR. Thus, the present embodiment carries out the switching at an earlier timing.

The rich threshold VRX may be set to a value smaller than the rich determination value VR and slightly larger (richer) than the stoichiometry equivalent value Vst or to a value smaller (leaner) than the stoichiometry equivalent value Vst. The rich threshold VRX may be set to a value VRX' smaller than the lean determination value VL (for example, 0.2 V), to a value VRX" equal to the lean determination value VL, or to a value VRX''' between the lean determination value VL and the stoichiometry equivalent value Vst.

Alternatively, the rich threshold VRX may be defied to be the value of the output Vr from the post-catalyst sensor obtained at a timing when the output Vr from the post-catalyst sensor starts to increase, specifically, a timing when the differential value of the output Vr from the post-catalyst sensor becomes larger than a predetermined positive value. This is because the catalyst substantially ends releasing oxygen at this timing. If the catalyst has a particularly high degree of abnormality, the timing when the catalyst substantially ends absorbing or releasing oxygen may be suitably sensed by using the differential value of the output Vr from the post-catalyst sensor.

On the other hand, during the lean control period (according to the preset embodiment, between t2 and t3), the basic method does not carry out the switching unless the output Vr from the post-catalyst sensor decreases to the lean determination value VL, which is smaller than the stoichiometry equivalent value Vst. In contrast, the present embodiment carries out the switching provided that the output Vr from the post-catalyst sensor decreases to the lean threshold VLX, which is richer than the lean determination value VL. Thus, the present embodiment carries out the switching at an earlier timing.

The lean threshold VLX may be set to a value larger than the lean determination value VL and slightly smaller (leaner) than the stoichiometry equivalent value Vst or to a value larger (richer) than the stoichiometry equivalent value Vst. The lean threshold VLX may be set to a value VLX' larger than the rich determination value VR (for example, 0.6 V), to a value VLX" equal to the rich determination value VR, or to a value VLX''' between the rich determination value VR and the stoichiometry equivalent value Vst. Alternatively, the lean threshold VLX may be defied to be the value of the output Vr from the post-catalyst sensor obtained at a timing when the output Vr from the post-catalyst sensor starts to decrease, specifically, at a timing when the differential value of the output Vr from the post-catalyst sensor becomes smaller than a predetermined negative value.

If the rich threshold VRX and the lean threshold VLX are set to an equal value, each of the thresholds VRX and VLX may be set close to the stoichiometry equivalent value Vst. The thresholds VRX and VLX may be set slightly larger (richer) or smaller (leaner) than the stoichiometry equivalent value Vst. In any way, the rich threshold VRX and the lean threshold VLX may be set to the optimum value with test results and the like taken into account.

The present embodiment omits the measurement of the amount of released oxygen OSCb and the amount of absorbed oxygen OSCa shown in the figures. Even if the amount of released oxygen OSCb and the amount of absorbed oxygen OSCa are measured, the present embodiment does not base diagnosis on these amounts. The omission of the measurement enables a sharp reduction in arithmetic loads on the ECU 20.

The present embodiment may be varied as described below. For simplification, this will be described in conjunction with the case where the catalyst is abnormal as shown in FIG. 8. Whether the catalyst is normal or abnormal is determined based only on the rate Ha of change between the point of time t11a and the point of time t2a during the lean control. The rate Hn of change between the point of time t21a and the point of time t3a during the rich control is not used as a basic for diagnosis.

During the latter period of the rich control, rich gas flowing out from the catalyst is supplied to the post-catalyst sensor 18. The output from the post-catalyst sensor 18 changes to the rich side. The rich gas contains exhaust gas components such as hydrogen ($H_2$) and methane ($CH_4$) which diffuse at relatively high speed. Thus, the output from the post-catalyst sensor tends to deviate slightly toward the rich side. This is likely to make the absolute value of the rate of a change in the output from the post-catalyst sensor from Vr(t21a) to Vr(t3a) or the speed of the change larger than the real values.

On the other hand, during the latter period of the lean control, lean gas flowing out from the catalyst is supplied to the post-catalyst sensor 18. The output from the post-catalyst sensor 13 changes toward the lean side. The lean gas does not contain a large amount of the above-described components such as hydrogen and methane but rather contains a large amount of exhaust gas components such as oxygen ($O_2$) and NOx which diffuse at a normal-level speed. Thus, the output from the post-catalyst sensor is unlikely to deviate as described above. The absolute value of the rate of a change in the output from the post-catalyst sensor from $Vr(t11a)$ to $Vr(t2a)$ or the speed of the change may be considered to be equal to the real values.

Thus, when whether the catalyst is normal or abnormal is determined based only on the change rate Ha during the lean control, the accuracy of detection of the change rate and thus the accuracy of diagnosis can be expected to be improved.

[Abnormality Diagnosis Process According to the Present Embodiment]

Figure 10:
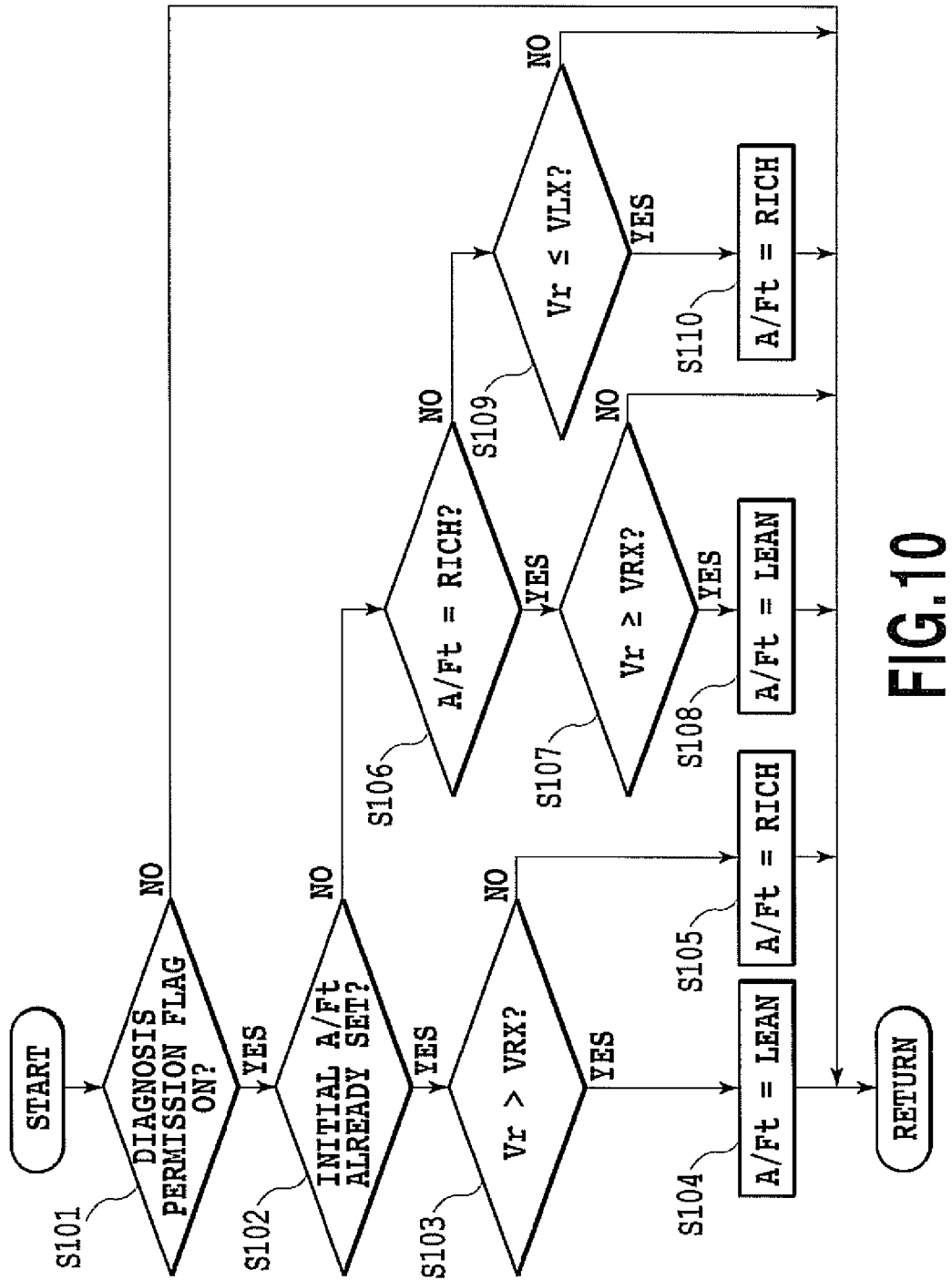
FIG. 10 is a flowchart for active air-fuel ratio control.
Figure 11:
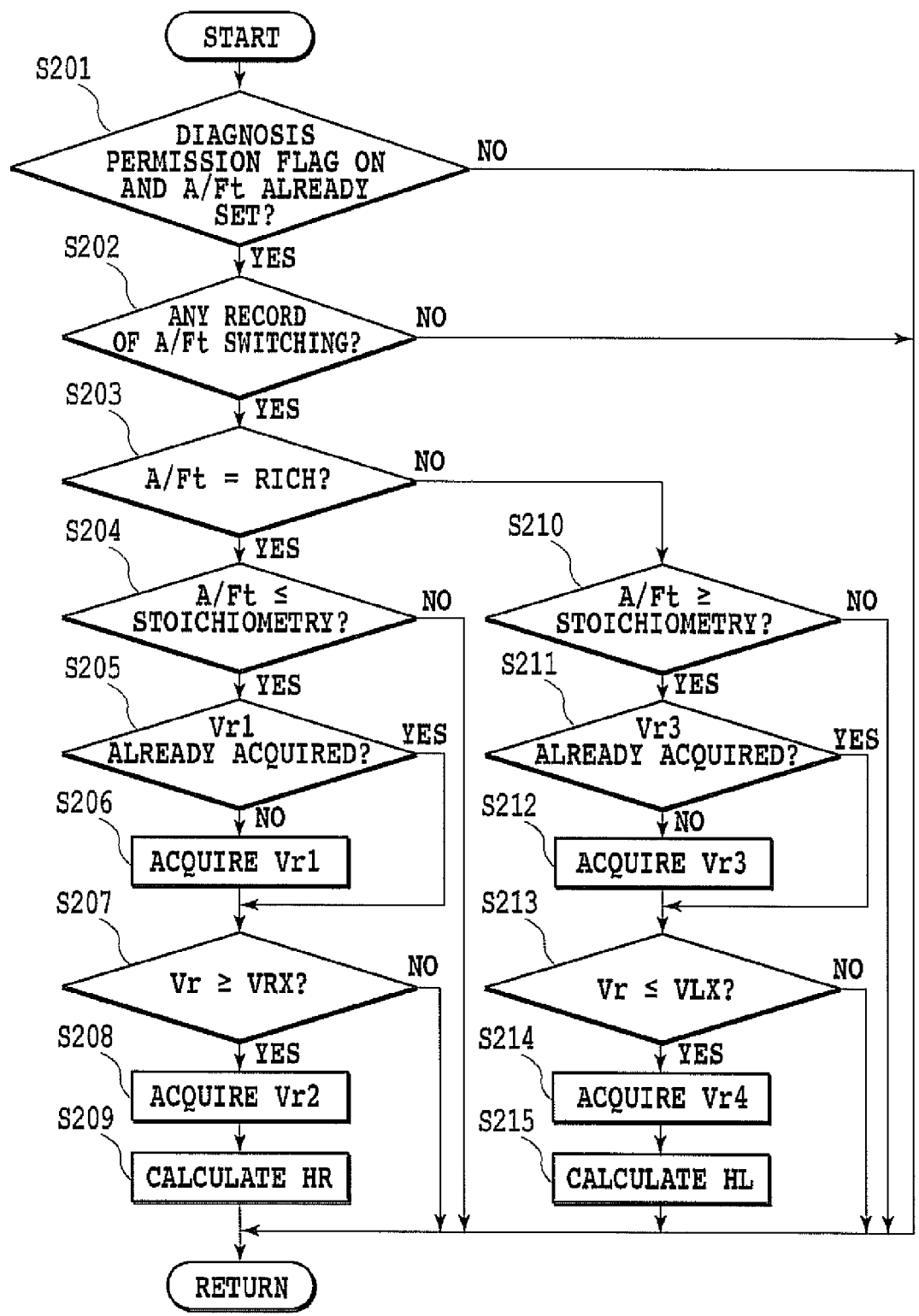
FIG. 11 is a flowchart for detection of a change rate.
Figure 12:
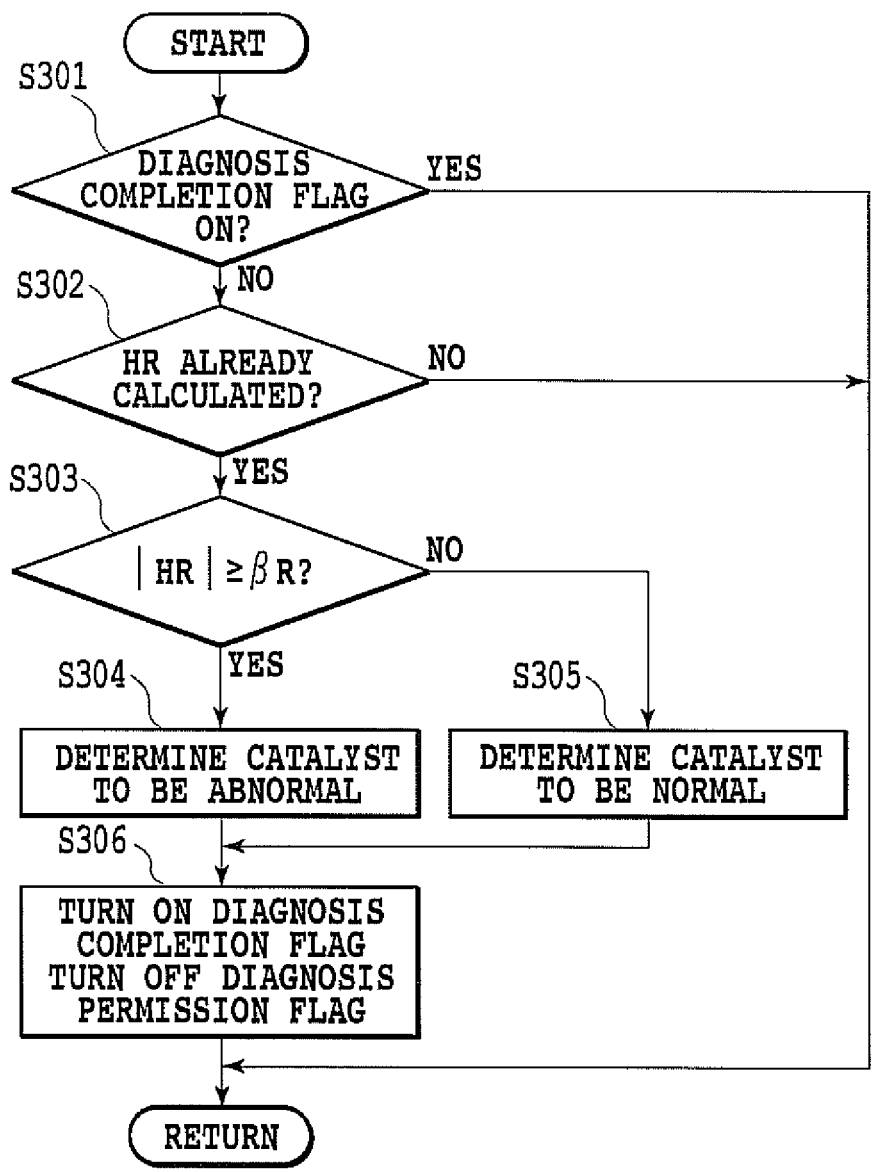
FIG. 12 is a flowchart for determination of whether the catalyst is normal or abnormal.

Now, an abnormality diagnosis process according to the present embodiment which is carried out by the ECU 20 will described. First, with reference to FIG. 10, a routine for the active air-fuel ratio control will be described. The routine is repeatedly carried out at predetermined calculation intervals (for example, at intervals of 16 msec). Here, as shown in FIG. 8 and FIG. 9, each of the lean threshold VLX and the rich threshold VRX is set equal to the stoichiometry equivalent value Vst (for example, 0.5 (V)).

In the first step S101, the routine determines whether or not diagnosis permission flag is on. The diagnosis permission flag is turned on when prerequisites for diagnosis are established. The prerequisites include (1) the condition that the amount of intake air Ga and the temperature of the catalyst Tc are in a predetermined relationship. The amount of intake air Ga is detected by the air flow meter. The temperature of the catalyst Tc is estimated by the ECU 20 based on the operating condition of the engine but may be detected directly by a temperature sensor.

If the engine is operating steadily, that is, if the rotation speed of the engine and the load on the engine are almost constant, the amount of intake air Ga and the temperature of the catalyst Tc are in a given correlation with each other. On the other hand, if the amount of intake air Ga and the temperature of the catalyst Tc deviate significantly from this correlation, the engine may be considered not to be operating steadily but to be performing an accelerating or decelerating operation, that is, a transitory operation.

Thus, the relationship between the amount of intake air Ga and the temperature of the catalyst Tc during a steady operation is pre-mapped so that when the actual values of the amount of intake air Ga and the temperature of the catalyst Tc are each within a predetermined range around the corresponding mapped value, the engine is determined to be operating steadily, resulting in a permitted diagnosis. In contrast, if each of the actual values is not within the predetermined range, the engine is determined not to be operating steadily, resulting in an inhibited diagnosis. This enables at least a given diagnosis accuracy to be ensured. Thus, the condition (1) means that the engine is substantially operating steadily.

The prerequisites also include (2) the condition that at least the upstream catalyst 11 is active, (3) the condition that the pre-catalyst sensor 17 and the post-catalyst sensor 18 are active, and (4) the condition that no diagnosis is completed during the current trip.

The condition (2) is established if the estimated catalyst temperature falls within a predetermined activating temperature range. The condition (3) is established if the element temperatures of the pre-catalyst sensor 17 and the post-catalyst sensor 18 fall within the respective activating temperature ranges. For the condition (4), the trip refers to the period between a start operation and a stop operation of the engine. According to the present embodiment, a diagnosis is carried out per trip, and the condition (4) is established if no diagnosis is completed during the current trip.

If the diagnosis permission flag is not on (the flag is off), the routine is terminated. On the other hand, if the diagnosis permission flag is turned on, the active air-fuel ratio control is performed during step S102 and the subsequent steps.

First, in step S102, the routine determines whether or not an initial target air-fuel ratio A/Ft is to be set at the current point of time. If the determination result is no, the routine proceeds to step S106.

If the determination result is yes, the routine proceeds to step S103 to determine whether or not the current output Vr from the post-catalyst sensor is larger than (is on the rich side with respect to) the rich threshold VRX.

If the determination result is yes, the routine proceeds to step S104 to set the target air-fuel ratio A/Ft to a lean value (for example, 15.1). On the other hand, if the determination result is no, the routine proceeds to step S105 to set the target air-fuel ratio A/Ft to a rich value (for example, 14.1). Then, the routine is terminated.

Thus, if the actual output Vr from the post-catalyst sensor immediately before the beginning of the active air-fuel ratio control is on the rich side, the initial target air-fuel ratio is set to a lean value, and the active air-fuel ratio control starts with the lean control. In contrast, if the actual output Vr from the post-catalyst sensor immediately before the beginning of the active air-fuel ratio control is on the lean side, the initial target air-fuel ratio is set to a rich value, and the active air-fuel ratio control starts with the rich control.

After the initial target air-fuel ratio A/Ft is set, the routine proceeds from step S102 to step S106. In step S106, the routine determines whether or not the current air-fuel ratio A/Ft is indicative of the rich state.

If the target air-fuel ratio A/Ft is indicative of the rich state, the routine proceeds to step S107 to determine whether or not the output Vr from the post-catalyst sensor is equal to or larger than the rich threshold VRX, that is, whether or not the output Vr from the post-catalyst sensor has been inverted to the rich side. If the determination result is no, the routine is terminated. If the determination result is yes, then in step S108, the target air-fuel ratio A/Ft is set to a lean value to switch from the rich control to the lean control. Then, the routine is terminated.

On the other hand, in step S106, if the target air-fuel ratio A/Ft is indicative of the lean state, the routine proceeds to step S109 to determine whether or not the output Vr from the post-catalyst sensor is equal to or smaller than (is on the lean side with respect to) the lean threshold VLX, that is, whether or not the output Vr from the post-catalyst sensor has been inverted to the lean side. If the determination result is no, the routine is terminated. If the determination result is yes, then in step S110, the target air-fuel ratio A/Ft is set to a rich value to switch from the lean control to the rich control. Then, the routine is terminated.

Now, a routine for detecting the change rate will be described. This routine is also repeatedly carried out by the ECU 20 at predetermined calculation intervals.

In step S201, the routine determines whether or not the diagnosis permission flag is on and the target air-fuel ratio A/Ft has been set. If the determination result is no, the routine is terminated. If the determination result is yes, the routine proceeds to step S202.

In step S202, the routine determines whether or not there is a record indicative of switching of the target air-fuel ratio A/Ft. If the determination result is no, the routine is terminated. If the determination result is yes, the routine proceeds to step S203.

In step S203, the routine determines whether or not the target air-fuel ratio A/Ft is indicative of the rich state. If the target air-fuel ratio is indicative of the rich state, the routine proceeds to step S209. If the target air-fuel ratio is not indicative of the rich state (is indicative of the lean state), the routine proceeds to step S210.

In step S204, the routine determines whether or not the pre-catalyst air-fuel ratio A/Ff detected by the pre-catalyst sensor 17 is equal to or smaller than the stoichiometry. If the determination result is no, the routine is terminated. If the determination result is yes, the routine proceeds to step S205.

In step S205, the routine determines whether or not an output Vr1 from the post-catalyst sensor has been acquired which corresponds to the point of time t1 when the pre-catalyst air-fuel ratio A/Ff has become equal to or smaller than the stoichiometry for the first time (that is, when the pre-catalyst air-fuel ratio A/Ff has reached the stoichiometry).

If the output Vr1 from the post-catalyst sensor has not been acquired, then in step S206, the routine acquires the output Vr1 from the post-catalyst sensor corresponding to the point of time t1, and then proceeds to step S207. On the other hand, if the output Vr1 from the post-catalyst sensor has already been acquired, the routine skips step S206 and proceeds to step S207.

In step S207, the routine determines whether or not the output Vr from the post-catalyst sensor is equal to or larger than the rich threshold VRX, that is, whether or not the output Vr from the post-catalyst sensor has been inverted to the rich side. If the determination result is no, the routine is terminated.

If the determination result is yes, then in step S208, the routine acquires an output Vr2 from the post-catalyst sensor corresponding to the point of time t2 when the output Vr from the post-catalyst sensor has become equal to or larger than the rich threshold VRX for the first time (that is, when the output Vr from the post-catalyst sensor has reached the rich threshold VRX).

In step S209, the routine calculates the rate HR of change in the output from the post-catalyst sensor during the rich control in accordance with the expression $HR=(Vr2-Vr1)/(t2-t1)$. The routine is terminated.

On the other hand, in step S210, the routine determines whether or not the pre-catalyst air-fuel ratio A/Ff has become equal to or larger than the stoichiometry. If the determination result is no, the routine is terminated. If the termination result is yes, the routine proceeds to step S211.

In step S211, the routine determines whether or not an output Vr3 from the post-catalyst sensor has been acquired which corresponds to the point of time t3 when the pre-catalyst air-fuel ratio A/Ff has become equal to or larger than the stoichiometry for the first time (that is, when the pre-catalyst air-fuel ratio A/Ff has reached the stoichiometry).

If the output Vr3 from the post-catalyst sensor has not been acquired, then in step S212, the routine acquires the output Vr3 from the post-catalyst sensor corresponding to the point of time t3, and then proceeds to step S213. On the other hand, if the output Vr3 from the post-catalyst sensor has already been acquired, the routine skips step S212 and proceeds to step S213.

In step S213, the routine determines whether or not the output Vr from the post-catalyst sensor is equal to or smaller than the lean threshold VLX, that is, whether or not the output Vr from the post-catalyst sensor has been inverted to the lean side. If the determination result is no, the routine is terminated.

If the determination result is yes, then in step S214, the routine acquires an output Vr4 from the post-catalyst sensor corresponding to a point of time t4 when the output Vr from the post-catalyst sensor has become equal to or smaller than the rich threshold VLX for the first time (that is, when the output Vr from the post-catalyst sensor has reached the lean threshold VLX).

In step S215, the routine calculates the rate HL of change in the output from the post-catalyst sensor during the lean control in accordance with the expression $HL=(Vr4-Vr3)/(t4-t3)$. The routine is terminated.

Now, a routine for determining whether the catalyst is normal or abnormal will be described. This routine is also repeatedly carried out by the ECU 20 at predetermined calculation intervals. A method for determining whether the catalyst is normal or abnormal using the rich control change rate HR will be described.

In step S301, the routine determines whether or not a diagnosis completion flag is on. If the determination result is yes, the routine is terminated. If the termination result is no (the diagnosis completion flag is off), the routine proceeds to step S302.

In step S302, the routine determines whether or not the rich control change rate HR has been calculated. If the determination result is no, the routine is terminated. If the termination result is yes, the routine proceeds to step S303.

In step S303, the routine compares the absolute value of the rich control change rate HR with a predetermined rich control abnormality determination value. If $HR \geq \beta R$, then in step S304, the routine determines the catalyst to be abnormal. If $HR < \beta R$, then in step S305, the routine determines the catalyst to be normal.

Then, in step S306, the diagnosis completion flag is turned on, the diagnosis permission flag is turned off, and the routine is terminated.

Figure 13:
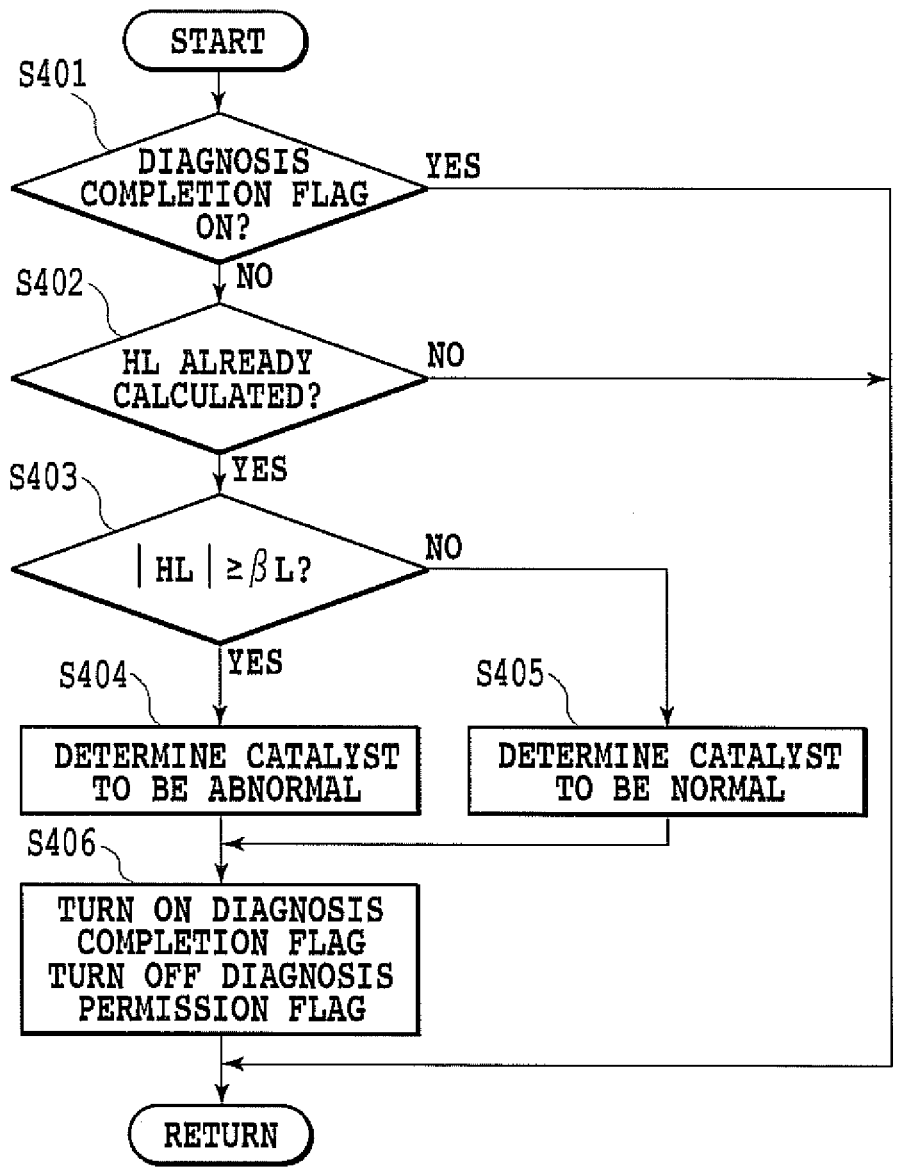
FIG. 13 is another flowchart for determination of whether the catalyst is normal or abnormal.

FIG. 13 shows another routine for determining whether the catalyst is normal or abnormal. This routine is almost similar to the above-described routine except that the lean control change rate HL is used instead of the rich control change rate HR. Steps S401 and S404 to S406 are similar to the above-described steps S301 and S304 to S306.

In step S402, the routine determines whether or not the lean control change rate HL has been calculated. If the determination result is no, the result is terminated. If the determination result is yes, the routine proceeds to step S403.

In step S403, the routine compares the absolute value of the lean control change rate HL with a predetermined lean control abnormality determination value $\beta L$. If $HL \geq \beta L$, then in step S404, the routine determines the catalyst to be abnormal. If $HL < \beta L$, then in step S405, the routine determines the catalyst to be normal.

In the described example, whether the catalyst is normal or abnormal is determined based on one rich control change rate HR or one lean control change rate HL. However, the present invention is not limited to this. Whether the catalyst is normal or abnormal may be determined, for example, based on the average value of a plurality of rich control change rates HR during a single active air-fuel ratio control operation. Alternatively, whether the catalyst is normal or abnormal may be determined, for example, based on the average value of a plurality of lean control change rates HL during a single active air-fuel ratio control operation.

Figure 14:
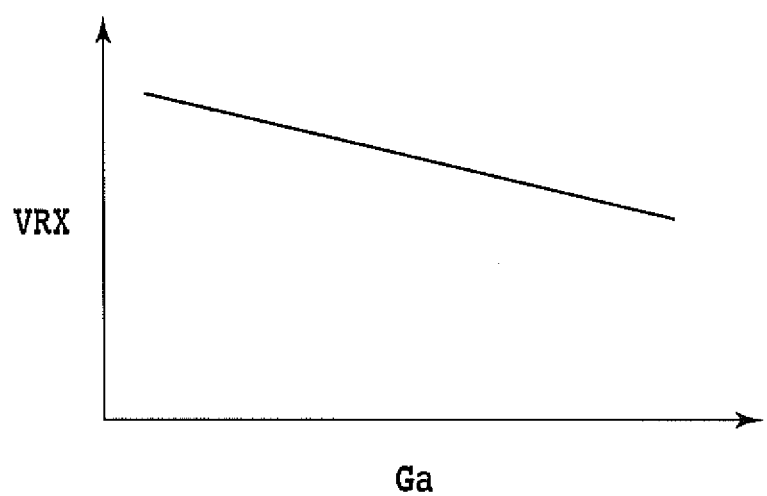
FIG. 14 is a map for use in setting a rich threshold.

Furthermore, the rich threshold VRX may be set in accordance with such a map as shown in FIG. 14, based on the flow rate of exhaust gas, specifically the amount of intake air Ga, which is a substitute value for the flow rate of exhaust gas. In this case, the rich threshold VRX is not fixed to a constant value but is varied depending on the amount of intake air Ga.

The map shows that a larger amount of intake air Ga reduces the rich threshold VRX (toward the lean side) and allows switching to the lean control to be achieved at an earlier timing. This enables a reduction in the adverse effect of the magnitude of the flow rate of exhaust gas on the output Vr from the post-catalyst sensor after switching.

Figure 15:
FIG. 15 is a map for use in setting a lean threshold.

Similarly, the lean threshold VLX may be set in accordance with such a map as shown in FIG. 15, based on the flow rate of exhaust gas, specifically the amount of intake air Ga, which is a substitute value for the flow rate of exhaust gas. In this case, the lean threshold VLX is also not fixed to a constant value but is varied depending on the amount of intake air Ga.

The map shows that a larger amount of intake air Ga increases the lean threshold VLX (toward the rich side) and allows switching to the rich control to be achieved at an earlier timing. This enables a reduction in the adverse effect of the magnitude of the flow rate of exhaust gas on the output Vr from the post-catalyst sensor after switching.

Thus, the present embodiment determines whether the catalyst is normal or abnormal based on the rate of a change in the output from the post-catalyst sensor which occurs after the output reaches the threshold, without measuring or taking into account of the amount of absorbed and released oxygen. Thus, the present embodiment can eliminate measurement errors resulting from measurement of the amount of oxygen that is not actually absorbed or released. The present embodiment can therefore improve the diagnosis accuracy and suppress erroneous diagnoses.

Furthermore, the present embodiment allows the air-fuel ratio control to be switched at an earlier timing than the basic method. The present embodiment can therefore further improve the diagnosis accuracy and suppress erroneous diagnoses.

The thus improved diagnosis accuracy enables even a slight difference in the degree of abnormality to be determined. Even if the difference in the degree of abnormality is originally small, the catalyst can be sufficiently accurately diagnosed.

The embodiment of the present invention has been described in detail. However, various other embodiments of the present invention are possible. For example, the internal combustion engine may have any applications and may be in any form. The internal combustion engine may be used for applications other than automobiles and may be of a direct injection type. Some portions of the above description refer to only one of the lean side and the rich side and of the absorption side and the release side. However, it is apparent to those skilled in the art that the description of one of the two items also allows the other to be understood. According to the above-described embodiment, the pre-catalyst sensor 17 directly detects the pre-catalyst air-fuel ratio. However, the ECU 20 may estimate the pre-catalyst air-fuel ratio based on the operating condition of the engine. In either way, at least the ECU 20 forms acquisition means for acquiring the pre-catalyst air-fuel ratio.

The present invention includes any variations, applications, and equivalents embraced by the concepts of the present invention defined by the claims. Thus, the present invention should not be interpreted in a limited manner but is applicable to any other techniques belonging to the range of concepts of the present invention.

The invention claimed is:

1. A catalyst abnormality diagnosis apparatus that diagnoses abnormality of a catalyst arranged in an exhaust passage in an internal combustion engine, comprising:
    an acquisition unit for acquiring a pre-catalyst air-fuel ratio that is an exhaust air-fuel ratio in an area located upstream of the catalyst;
    a post-catalyst sensor that detects the exhaust air-fuel ratio in an area located downstream of the catalyst;
    an active air-fuel ratio control unit for alternately controlling the air-fuel ratio in the area located upstream of the catalyst between a lean side and a rich side with respect to a stoichiometry; and
    a determination unit for determining whether the catalyst is normal or abnormal,
    wherein the active air-fuel ratio control unit switches between a lean control and a rich control at an identical time when an output from the post-catalyst sensor reaches a threshold,
    the determination unit determines whether the catalyst is normal or abnormal based on a rate of a change in the output from the post-catalyst sensor between a first point of time when the pre-catalyst air-fuel ratio acquired by the acquisition unit reaches the stoichiometry after the output from the post-catalyst sensor reaches the threshold and a second point of time when the output from the post-catalyst sensor reaches the threshold next time,
    the threshold includes a lean threshold that defines a timing for switching from the lean control to the rich control and a rich threshold that defines a timing for switching from the rich control to the lean control,
    the lean threshold is set to a value richer than a reference lean determination value defined to be leaner than a stoichiometry equivalent value of the output from the post-catalyst sensor, and is set to a value richer than the stoichiometry equivalent value,
    the rich threshold is set to a value leaner than a reference rich determination value defined to be richer than the stoichiometry equivalent value, and is set to a value leaner than the stoichiometry equivalent value,
    the active air-fuel ratio control unit switches an air-fuel ratio control from the rich control to the lean control at an identical time when the output from the post-catalyst sensor reaches the rich threshold during change to the rich side, and switches the air-fuel ratio control from the lean control to the rich control at an identical time when the output from the post-catalyst sensor reaches the lean threshold during change to the lean side,
    the determination unit determines whether the catalyst is normal or abnormal based on at least one of the rate of the change in the output from the post-catalyst sensor between a first point of time when the pre-catalyst air-fuel ratio acquired by the acquisition unit reaches the stoichiometry after the output from the post-catalyst sensor reaches the rich threshold during change to the rich side and a second point of time when the output from the post-catalyst sensor reaches the lean threshold next time during change to the lean side, and the rate of the change in the output from the post-catalyst sensor between a first point of time when the pre-catalyst air-fuel ratio acquired by the acquisition unit reaches the stoichiometry after the output from the post-catalyst sensor reaches the lean threshold during change to the lean side and a second point of time when the output from the post-catalyst sensor reaches the rich threshold next time during change to the rich side.

2. The catalyst abnormality diagnosis apparatus according to claim 1, wherein the lean threshold and the rich threshold are set according to a flow rate of exhaust gas.

3. The catalyst abnormality diagnosis apparatus according to claim 1, wherein the change rate has a value obtained by dividing the difference between the output from the post-catalyst sensor at the first point of time and the output from the post-catalyst sensor at the second point of time by a time between the first point of time and the second point of time.

4. The catalyst abnormality diagnosis apparatus according to claim 1, wherein the change rate has a value obtained by dividing the difference between the output from the post-catalyst sensor at the first point of time and the output from the post-catalyst sensor at the second point of time by an amount of exhaust gas measured between the first point of time and the second point of time.

\* \* \* \* \*